US009914266B2

United States Patent
Ueda et al.

(10) Patent No.: US 9,914,266 B2
(45) Date of Patent: Mar. 13, 2018

(54) THREE-DIMENSIONAL PRINTING APPARATUS

(71) Applicant: Roland DG Corporation, Hamamatsu-shi, Shizuoka (JP)

(72) Inventors: Jun Ueda, Hamamatsu (JP); Takayuki Sakurai, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 153 days.

(21) Appl. No.: 15/176,305

(22) Filed: Jun. 8, 2016

(65) Prior Publication Data
US 2016/0368221 A1  Dec. 22, 2016

(30) Foreign Application Priority Data
Jun. 18, 2015  (JP) ................ 2015-122787

(51) Int. Cl.
  *B29C 67/00*  (2017.01)
  *B33Y 30/00*  (2015.01)
  *B33Y 10/00*  (2015.01)

(52) U.S. Cl.
  CPC ........... *B29C 67/007* (2013.01); *B33Y 10/00* (2014.12); *B33Y 30/00* (2014.12)

(58) Field of Classification Search
  CPC ..................................... B33Y 30/00
  See application file for complete search history.

(56) References Cited

U.S. PATENT DOCUMENTS

| 2002/0155189 A1 | 10/2002 | John |
| 2008/0169586 A1 | 7/2008 | Hull et al. |
| 2016/0279707 A1* | 9/2016 | Mattes ............... B41J 2/451 |
| 2017/0173883 A1* | 6/2017 | Gray ................. B22F 3/1055 |

FOREIGN PATENT DOCUMENTS

| JP | 2003-039564 A | 2/2003 |
| JP | 2014-037148 A | 2/2014 |

* cited by examiner

*Primary Examiner* — Ryan Ochylski
(74) *Attorney, Agent, or Firm* — Keating & Bennett, LLP

(57) ABSTRACT

A three-dimensional printing apparatus includes a controller to control first and second projectors that apply equal or substantially equal total amounts of optical energy. The controller performs first and second projecting operations. The first projecting operation involves simultaneously projecting first and second cross-sectional sub-images from the first projector onto first and second areas of an image projecting surface, respectively, and the second and third cross-sectional sub-images from the second projector onto the second and third areas of the image projecting surface, respectively. The second projecting operation involves simultaneously projecting the first cross-sectional sub-image from the first projector onto the first area and the third cross-sectional sub-image from the second projector onto the third area. The controller equalizes the number of times the first to third cross-sectional sub-images are to be respectively projected onto the first to third areas.

7 Claims, 13 Drawing Sheets

THREE-DIMENSIONAL PRINTING APPARATUS

This application claims priority to Patent Application No. 2015-122787 filed in Japan on Jun. 18, 2015, the entire contents of which are hereby incorporated by reference.

BACKGROUND OF THE INVENTION

1. Field of the Invention

The present invention relates to three-dimensional printing apparatuses.

2. Description of the Related Art

A known three-dimensional printing apparatus applies light to liquid photo-curable resin stored in a tank so as to cure the photo-curable resin, thus printing a three-dimensional object.

For example, JP 2003-39564 A discloses a three-dimensional printing apparatus including a table provided with an opening; a tank that is placed on the table and stores photo-curable resin; a raisable and lowerable holder disposed above the tank; and a projecting device disposed below the table. The projecting device projects a cross-sectional image representing a cross-sectional shape of a three-dimensional object to be printed. The cross-sectional image, which has been projected from the projecting device, is reflected by a mirror and thus projected onto the photo-curable resin in the tank through the opening of the table. A portion of the photo-curable resin stored in the tank and corresponding to the cross-sectional shape represented by the cross-sectional image is cured so as to form a resin layer conforming to the cross-sectional shape. A region of the tank onto which a cross-sectional image is to be projected is a printing region.

A change in the cross-sectional shape represented by a cross-sectional image to be projected allows curing of an appropriate portion of the photo-curable resin stored in the tank. This enables formation of a resin layer having a desired cross-sectional shape. Sequential raising of the holder causes resin layers each having a desired cross-sectional shape to be formed continuously downward. Thus, a desired three-dimensional object is printed.

Although the three-dimensional printing apparatus disclosed in JP 2003-39564 A prints a three-dimensional object using the projecting device provided with a single projector, another known technique is to utilize a plurality of projectors so as to print a three-dimensional object using a larger printing region. This technique causes cross-sectional images projected from the projectors to overlap with each other in the printing region so that no gap exists between the cross-sectional images projected from the projectors.

Unfortunately, when cross-sectional images projected from projectors overlap with each other in a printing region, the total amount of optical energy applied to an area where the cross-sectional images overlap with each other is larger than the total amount of optical energy applied to an area where the cross-sectional images do not overlap with each other. This results in variations in the degree of curing of photo-curable resin stored in a tank. In other words, a portion of the photo-curable resin where the total amount of optical energy is larger may be cured to an excessive degree. To cope with this problem, JP 2014-37148 A discloses a technique by which the total amount of optical energy to be applied to an area where cross-sectional images overlap with each other is reduced in accordance with the total amount of optical energy to be applied to an area where cross-sectional images do not overlap with each other.

The technique disclosed in JP 2014-37148 A adjusts the total amount of optical energy to be applied to an area where cross-sectional images overlap with each other. There is, however, the need for a technique to reduce or eliminate variations in the degree of curing of photo-curable resin more easily without adjusting the total amount of optical energy.

SUMMARY OF THE INVENTION

Accordingly, preferred embodiments of the present invention provide a three-dimensional printing apparatus that prints a three-dimensional object while reducing or eliminating variations in a degree of curing of photo-curable resin without adjusting total amounts of optical energy to be applied from projectors.

A three-dimensional printing apparatus according to a preferred embodiment of the present invention cures photo-curable resin so as to sequentially stack resin layers each having a predetermined cross-sectional shape, thus printing a three-dimensional object. The three-dimensional printing apparatus includes a tank, a projector, and a controller. The tank stores photo-curable resin. The tank includes an image projecting surface that is an interface of the tank with the photo-curable resin. The projector projects a cross-sectional image onto the image projecting surface. The cross-sectional image represents a predetermined cross-sectional shape. The cross-sectional image includes a first cross-sectional sub-image, a second cross-sectional sub-image, and a third cross-sectional sub-image. The controller is configured or programmed to control the projector. The image projecting surface includes a first area; a second area adjacent to the first area; and a third area adjacent to the second area. The projector includes a first projector and a second projector. The first projector is capable of projecting the first cross-sectional sub-image onto the first area, and the second cross-sectional sub-image onto the second area. The second projector is capable of projecting the second cross-sectional sub-image onto the second area, and the third cross-sectional sub-image onto the third area. The first projector and the second projector apply equal or substantially equal total amounts of optical energy. The controller performs a first projecting operation and a second projecting operation. The first projecting operation involves simultaneously projecting the first cross-sectional sub-image and the second cross-sectional sub-image from the first projector onto the first area and the second area, respectively and the second cross-sectional sub-image and the third cross-sectional sub-image from the second projector onto the second area and the third area, respectively. The second projecting operation involves simultaneously projecting the first cross-sectional sub-image from the first projector onto the first area and the third cross-sectional sub-image from the second projector onto the third area. The controller equalizes the number of times the first to third cross-sectional sub-images are to be respectively projected onto the first to third areas.

The projector of the three-dimensional printing apparatus according to this preferred embodiment of the present invention includes the first projector and the second projector. This enables the projector to project the cross-sectional image, which is larger in size, onto the image projecting surface. The first projecting operation involves simultaneously projecting the first cross-sectional sub-image and the second cross-sectional sub-image from the first projector onto the first area and the second area, respectively and the second cross-sectional sub-image and the third cross-sectional sub-image from the second projector onto the second area and the third area, respectively. This leaves no gap between a set of the first and second cross-sectional sub-images projected from the first projector and a set of the second and third cross-sectional sub-images projected from the second projector, thus enabling reliable curing of the photo-curable resin across an entirety of the first to third cross-sectional sub-images. During the first projecting operation, the first projector and the second projector each project the second cross-sectional sub-image onto the second area, which means that the number of cross-sectional sub-images to be projected onto the second area is larger than the number of cross-sectional sub-images to be projected onto each of the first area and the third area. In this preferred embodiment, however, the controller further performs the second projecting operation. Specifically, the second projecting operation involves simultaneously projecting the first cross-sectional sub-image from the first projector onto the first area and the third cross-sectional sub-image from the second projector onto the third area. During the second projecting operation, neither the first projector nor the second projector projects the second cross-sectional sub-image onto the second area. The controller performs the first projecting operation and the second projecting operation so as to equalize the number of times the first to third cross-sectional sub-images are respectively projected onto the first to third areas. Thus, equal or substantially equal total amounts of optical energy are applied to the photo-curable resin for the second area onto which the second cross-sectional sub-image is projected from each of the first projector and the second projector, the first area onto which the first cross-sectional sub-image is projected from only the first projector, and the third area onto which the third cross-sectional sub-image is projected from only the second projector. In other words, the photo-curable resin is cured uniformly, reducing or eliminating variations in the degree of curing of the photo-curable resin. Consequently, the three-dimensional printing apparatus according to this preferred embodiment of the present invention reduces or eliminates variations in the degree of curing of the photo-curable resin without adjusting the total amounts of optical energy to be applied from the first projector and the second projector.

Thus, various preferred embodiments of the present invention provide a three-dimensional printing apparatus that reduces or eliminates variations in the degree of curing of photo-curable resin without adjusting the total amounts of optical energy to be applied from projectors.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Three-dimensional printing apparatuses according to preferred embodiments of the present invention will be described below with reference to the drawings. The preferred embodiments described below are naturally not intended to limit the present invention in any way. Components or elements having the same functions are identified by the same reference signs, and description thereof will be simplified or omitted when deemed redundant.

First Preferred Embodiment

Figure 1:
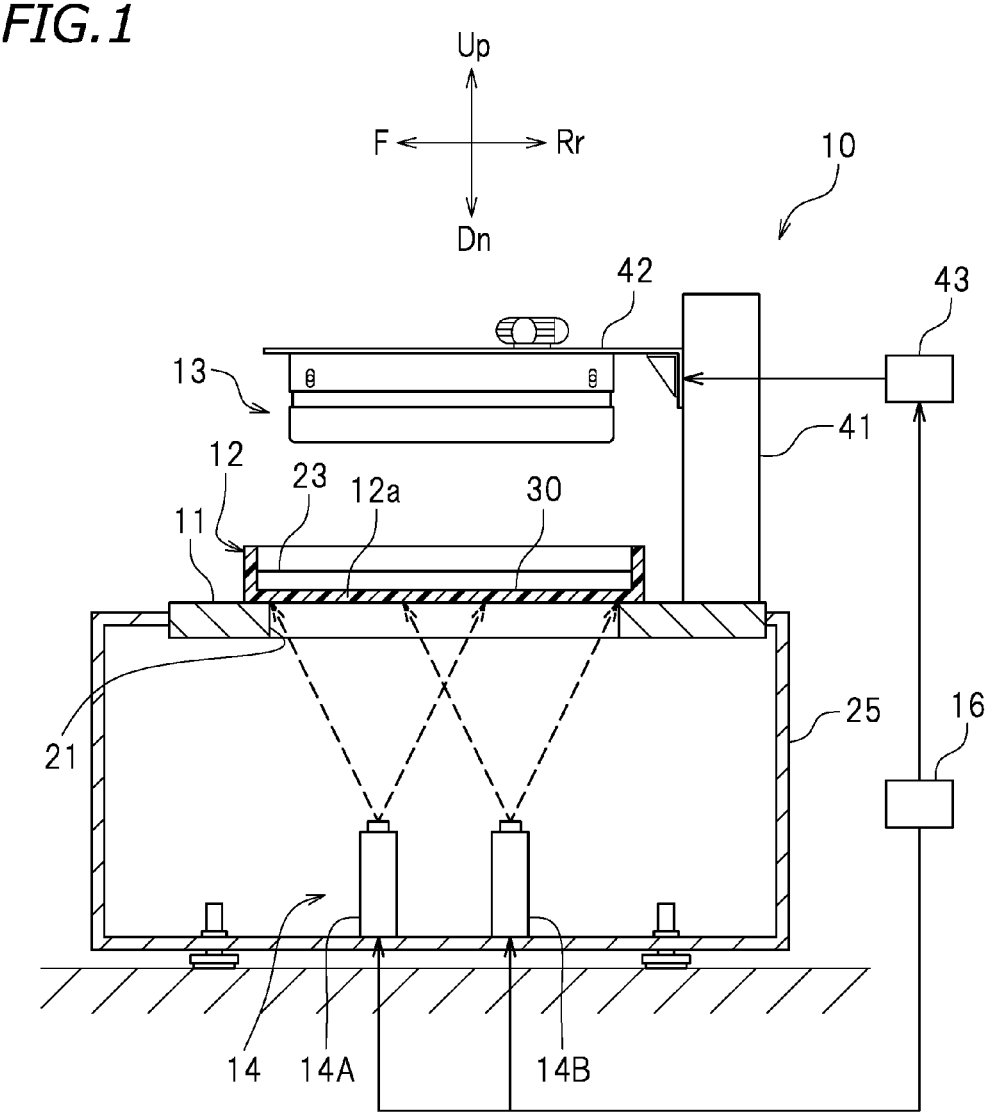
FIG. 1 is a cross-sectional view of a three-dimensional printing apparatus according to a first preferred embodiment of the present invention.
Figure 2:
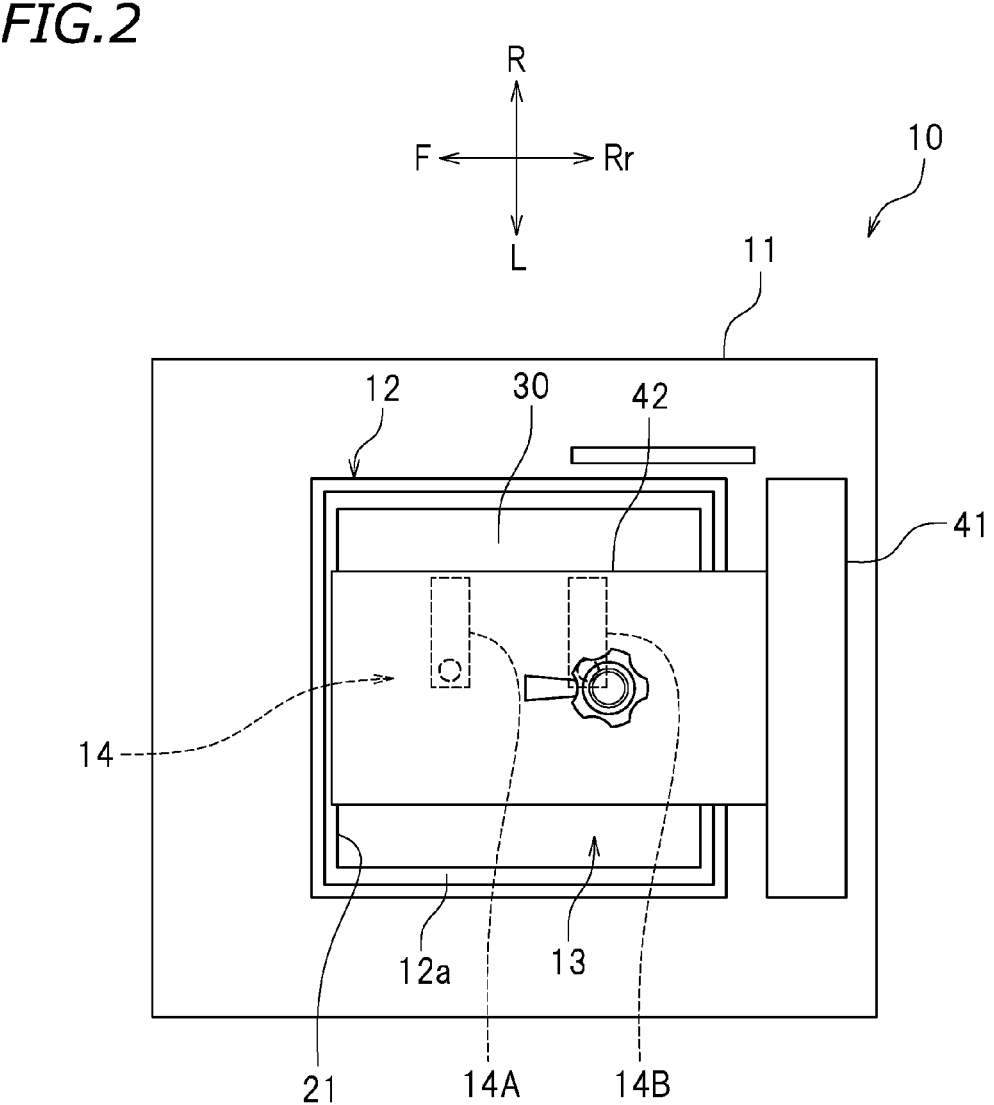
FIG. 2 is a plan view of the three-dimensional printing apparatus according to the first preferred embodiment of the present invention.

FIG. 1 is a cross-sectional view of a three-dimensional printing apparatus 10 according to a first preferred embodiment of the present invention. FIG. 2 is a plan view of the three-dimensional printing apparatus 10. The reference signs F, Rr, R, L, Up, and Dn in the drawings respectively represent front, rear, right, left, up, and down. The reference sign X in the drawings represents an X axis extending in the front-rear direction. The reference sign Y in the drawings represents a Y axis extending in the right-left direction. These directions are, however, defined merely for the sake of convenience and thus do not limit in any way how the three-dimensional printing apparatus 10 may be installed.

The three-dimensional printing apparatus 10 is configured to print a three-dimensional object. In accordance with cross-sectional images representing cross-sectional shapes of a three-dimensional object to be printed, the three-dimensional printing apparatus 10 cures liquid photo-curable resin so as to sequentially stack resin layers each having a cross-sectional shape conforming to the associated cross-sectional image, thus printing the three-dimensional object. As used herein, the term "cross-sectional shape" refers to a cross-sectional shape obtained when a three-dimensional object is sliced so that the sliced portions of the three-dimensional object each have a predetermined thickness (e.g., a thickness of about 0.1 mm) in the up-down direction. The term "cross-sectional shape" may also refer to a cross-sectional shape obtained when a three-dimensional object is sliced so that the sliced portions of the three-dimensional object have predetermined different thicknesses in the up-down direction. The term "photo-curable resin" refers to resin that is cured upon being irradiated with light of a predetermined wavelength. The three-dimensional printing apparatus 10 preferably includes a table 11, a tank 12, a holder 13, a projector 14, and a controller 16.

As illustrated in FIG. 1, the table 11 is supported by a case 25. The table 11 is provided with an opening 21. Light to be applied to photo-curable resin 23 passes through the opening 21.

As illustrated in FIG. 1, the tank 12 stores the photo-curable resin 23 in liquid form. As illustrated in FIG. 2, the tank 12 is placed on the table 11 so as to be attached to the table 11. The tank 12 placed on the table 11 covers the opening 21 of the table 11. The tank 12 is made of a light-transmissive material, such as a transparent material.

Figure 3:
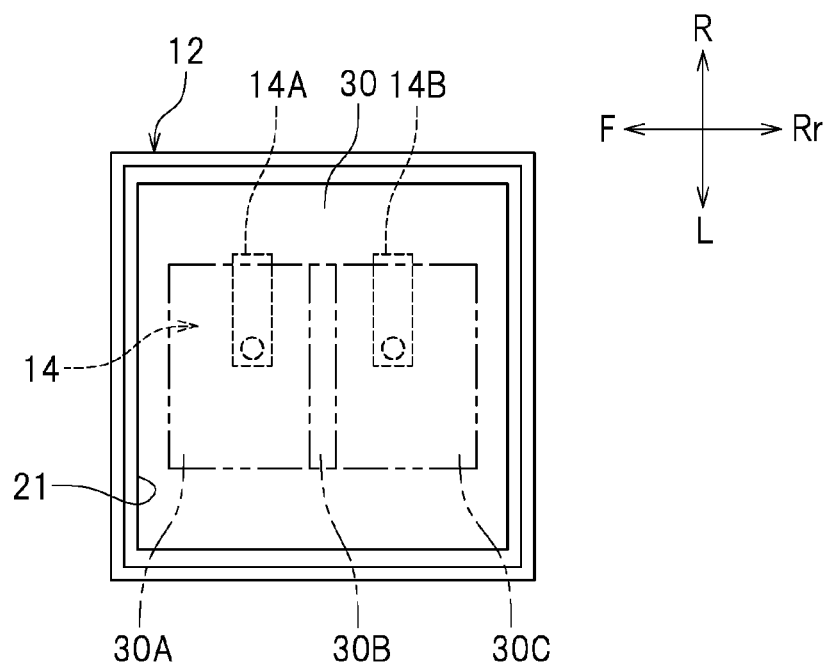
FIG. 3 is a schematic diagram illustrating areas of an image projecting surface according to the first preferred embodiment of the present invention.

As illustrated in FIG. 1, the tank 12 is provided with an image projecting surface 30. The image projecting surface 30 defines and functions as the interface of the tank 12 with the photo-curable resin 23. More specifically, the image projecting surface 30 defines and functions as the interface of a bottom wall 12a of the tank 12 with the photo-curable resin 23. As illustrated in FIG. 2, the image projecting surface 30 is located inward of the opening 21. The projector 14 projects a cross-sectional image representing a predetermined cross-sectional shape onto the image projecting surface 30. As illustrated in FIG. 3, the image projecting surface 30 preferably includes a first area 30A, a second area 30B adjacent to the first area 30A, and a third area 30C adjacent to the second area 30B. The first area 30A, the second area 30B, and the third area 30C are aligned in the front-rear direction. Alternatively, the first area 30A, the second area 30B, and the third area 30C may be aligned in the right-left direction.

As illustrated in FIG. 1, the holder 13 is disposed above the tank 12 and the opening 21 of the table 11. The holder 13 is lowerable such that when the holder 13 is lowered, the holder 13 is immersed in the photo-curable resin 23 in the tank 12. The holder 13 is raisable such that when the holder 13 is raised, the holder 13 lifts the photo-curable resin 23 cured by being irradiated with light. In this preferred embodiment, the table 11 is provided with a support column 41 extending in the up-down direction. A slider 42 is attached to the front portion of the support column 41. The slider 42 is raisable and lowerable along the support column 41. The slider 42 is moved upward or downward by a motor 43. In this preferred embodiment, the holder 13 is disposed in front of the support column 41 and attached to the slider 42. Thus, the holder 13 is moved upward or downward by the motor 43.

The projector 14 preferably includes a first projector 14A and a second projector 14B. The first projector 14A and the second projector 14B receive signals of cross-sectional images from the controller 16. Each cross-sectional image includes a plurality of cross-sectional sub-images. As illustrated in FIG. 3, the first projector 14A is capable of projecting cross-sectional sub-images onto the first area 30A and the second area 30B. The second projector 14B is capable of projecting cross-sectional sub-images onto the second area 30B and the third area 30C. The first projector 14A applies light of a predetermined wavelength so as to project cross-sectional sub-images onto the first area 30A and the second area 30B. The second projector 14B applies light of a predetermined wavelength so as to project cross-sectional sub-images onto the second area 30B and the third area 30C. The first projector 14A and the second projector 14B apply equal or substantially equal total amounts of optical energy. The illuminance of light to be applied is multiplied by the time during which the light is to be applied, thus calculating the total amount of optical energy. Cross-sectional sub-images are projected from the first projector 14A and the second projector 14B onto the photo-curable resin 23 in the tank 12 through the opening 21 of the table 11.

As illustrated in FIG. 1, the first projector 14A and the second projector 14B are disposed below the tank 12. The first projector 14A and the second projector 14B are housed in the case 25. The first projector 14A and the second projector 14B are aligned in the front-rear direction. Alternatively, the first projector 14A and the second projector 14B may be aligned in the right-left direction. The first projector 14A and the second projector 14B are disposed so that a portion of a cross-sectional image, i.e., a set of cross-sectional sub-images, projected from the first projector 14A and a portion of the cross-sectional image, i.e., a set of cross-sectional sub-images, projected from the second projector 14B overlap with each other in the second area 30B (see FIG. 3). In other words, no gap exists between a set of cross-sectional sub-images projected from the first projector 14A and a set of cross-sectional sub-images projected from the second projector 14B.

Figure 4:
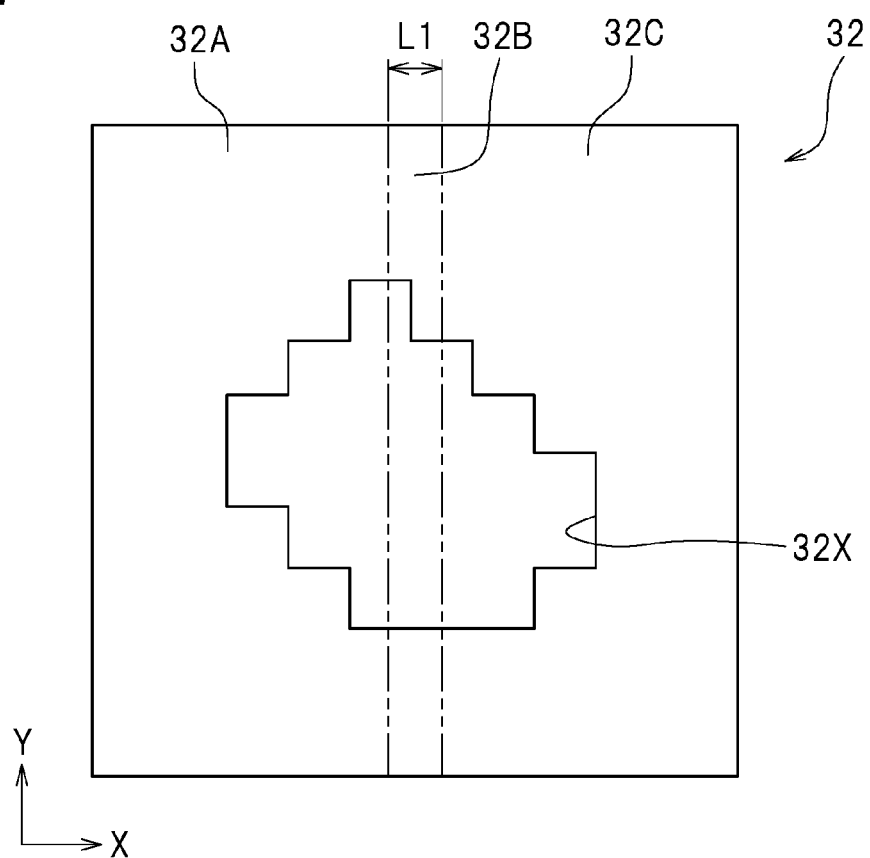
FIG. 4 is a schematic diagram illustrating a cross-sectional image according to the first preferred embodiment of the present invention.

FIG. 4 illustrates one of cross-sectional images 32 projected from the first projector 14A and the second projector 14B onto the image projecting surface 30. A three-dimensional object to be printed is sliced at predetermined intervals so as to obtain layers having cross-sectional shapes 32X. Each cross-sectional image 32 includes the cross-sectional shape 32X of an associated one of the layers. The cross-sectional images 32 may include the cross-sectional shapes 32X identical to each other and/or the cross-sectional shapes 32X different from each other. Each cross-sectional image 32 includes a first cross-sectional sub-image 32A projected onto the first area 30A (see FIG. 3) of the image projecting surface 30, a second cross-sectional sub-image 32B projected onto the second area 30B (see FIG. 3), and a third cross-sectional sub-image 32C projected onto the third area 30C (see FIG. 3). The second cross-sectional sub-image 32B has an X-axis length L1 equivalent to $N_1$ pixel(s), where $N_1$ is an integer of 1 to 10, for example. The controller 16 controls the first projector 14A and the second projector 14B so that the cross-sectional images 32 are sequentially projected onto the image projecting surface 30 at predetermined time intervals. The chain double-dashed lines in FIG. 4 indicate a boundary between the first cross-sectional sub-image 32A and the second cross-sectional sub-image 32B and a boundary between the second cross-sectional sub-image 32B and the third cross-sectional sub-image 32C.

As illustrated in FIG. 1, the controller 16 is connected to the motor 43 to raise and lower the slider 42 to which the holder 13 is attached, the first projector 14A, and the second projector 14B. The controller 16 drives the motor 43 so as to cause the slider 42 and the holder 13 to move upward or downward. The controller 16 controls the projector 14. Specifically, the controller 16 controls the first projector 14A and the second projector 14B. The controller controls, for example, the first to third cross-sectional sub-images 32A to 32C to be projected from the first and second projectors 14A and 14B, the timing of projection of the first to third cross-sectional sub-images 32A to 32C, and optical energy to be applied from the first and second projectors 14A and 14B. The controller 16 is not limited to any particular configuration. In one example, the controller 16 may be a computer that includes a central processing unit (CPU), a read-only memory (ROM) storing, for example, a program to be executed by the CPU, and a random-access memory (RAM).

The controller 16 performs a first projecting operation and a second projecting operation. The controller 16 according to this preferred embodiment performs the first projecting operation prior to the second projecting operation. Alternatively, the controller 16 may perform the second projecting operation prior to the first projecting operation. The controller 16 alternately and repeatedly performs the first projecting operation and the second projecting operation. Alternatively, the controller 16 may continuously perform each of the first projecting operation and the second projecting operation.

As illustrated in FIG. 3, the first projecting operation involves simultaneously projecting cross-sectional sub-images from the first projector 14A onto the first area 30A and the second area 30B, and cross-sectional sub-images from the second projector 14B onto the second area 30B and the third area 30C. Specifically, during the first projecting operation, the first projector 14A projects the first cross-sectional sub-image 32A (see FIG. 4) of the cross-sectional image 32 onto the first area 30A, and projects the second cross-sectional sub-image 32B (see FIG. 4) onto the second area 30B. During the first projecting operation, the second projector 14B projects the second cross-sectional sub-image 32B of the cross-sectional image 32 onto the second area 30B, and projects the third cross-sectional sub-image 32C (see FIG. 4) onto the third area 30C.

Figure 5:
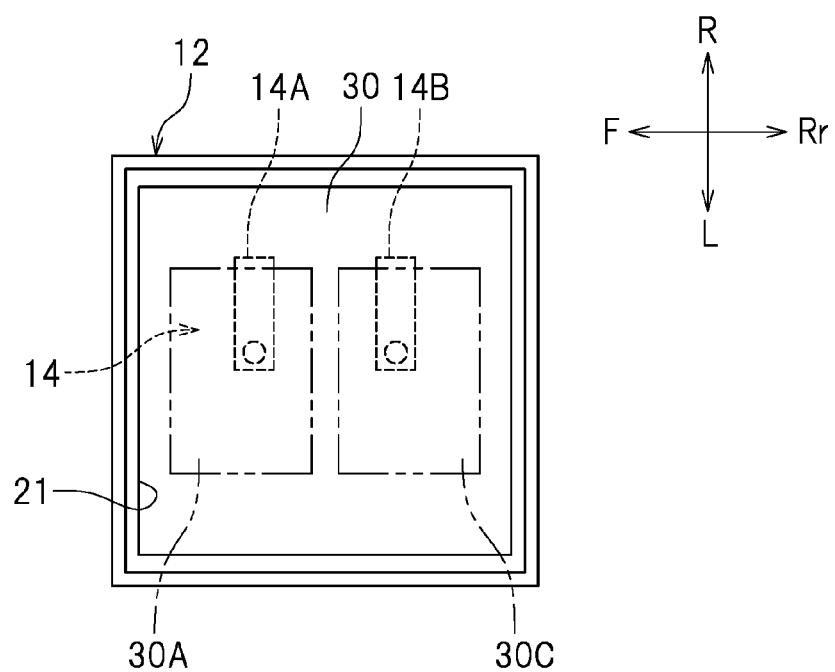
FIG. 5 is a schematic diagram illustrating the areas of the image projecting surface according to the first preferred embodiment of the present invention.

As illustrated in FIG. 5, the second projecting operation involves simultaneously projecting a cross-sectional sub-image from the first projector 14A onto the first area 30A and a cross-sectional sub-image from the second projector 14B onto the third area 30C. Specifically, during the second projecting operation, the first projector 14A projects the first cross-sectional sub-image 32A onto the first area 30A without projecting the second cross-sectional sub-image 32B onto the second area 30B. During the second projecting operation, the second projector 14B projects the third cross-sectional sub-image 32C onto the third area 30C without projecting the second cross-sectional sub-image 32B onto the second area 30B.

The controller 16 equalizes the number of times the first cross-sectional sub-image 32A is to be projected onto the first area 30A, the number of times the second cross-sectional sub-image 32B is to be projected onto the second area 30B, and the number of times the third cross-sectional sub-image 32C is to be projected onto the third area 30C. In this preferred embodiment, each time the controller 16 performs the first projecting operation, the first cross-sectional sub-image 32A is projected onto the first area 30A once, the second cross-sectional sub-image 32B is projected onto the second area 30B twice, and the third cross-sectional sub-image 32C is projected onto the third area 30C once. Each time the controller 16 performs the second projecting operation, the first cross-sectional sub-image 32A is projected onto the first area 30A once, and the third cross-sectional sub-image 32C is projected onto the third area 30C once. Thus, the controller 16 performs the first projecting operation and the second projecting operation the same number of times so that the number of times the first cross-sectional sub-image 32A is projected onto the first area 30A, the number of times the second cross-sectional sub-image 32B is projected onto the second area 30B, and the number of times the third cross-sectional sub-image 32C is projected onto the third area 30C are equal or substantially equal to each other.

The controller 16 sets the total amounts of optical energy to be applied from the first projector 14A and the second projector 14B so that the photo-curable resin 23 is cured when the first to third cross-sectional sub-images 32A to 32C are respectively projected onto the first to third areas 30A to 30C a predetermined number of times. For example, supposing that the controller 16 performs each of the first projecting operation and the second projecting operation once, the first to third cross-sectional sub-images 32A to 32C are respectively projected onto the first to third areas 30A to 30C twice. Thus, the controller 16 sets the total amounts of optical energy to be applied from the first projector 14A and the second projector 14B so that the photo-curable resin 23 is cured when the first to third cross-sectional sub-images 32A to 32C are respectively projected onto the first to third areas 30A to 30C twice.

As illustrated in FIG. 3, the first projecting operation according to the above-described preferred embodiment involves simultaneously projecting the first cross-sectional sub-image 32A (see FIG. 4) and the second cross-sectional sub-image 32B (see FIG. 4) from the first projector 14A onto the first area 30A and the second area 30B, respectively and the second cross-sectional sub-image 32B and the third cross-sectional sub-image 32C (see FIG. 4) from the second projector 14B onto the second area 30B and the third area 30C, respectively. This leaves no gap between a set of the cross-sectional sub-images 32A and 32B projected from the first projector 14A and a set of the cross-sectional sub-images 32B and 32C projected from the second projector 14B, thus enabling reliable curing of the photo-curable resin 23 (see FIG. 1) across an entirety of the first to third cross-sectional sub-images 32A to 32C. During the first projecting operation, the first projector 14A and the second projector 14B each project the cross-sectional sub-image 32B onto the second area 30B, which means that the number of cross-sectional sub-images projected onto the second area 30B is larger than the number of cross-sectional sub-images projected onto each of the first area 30A and the third area 30C. In this preferred embodiment, however, the controller 16 further performs the second projecting operation. Specifically, the second projecting operation involves simultaneously projecting the first cross-sectional sub-image 32A from the first projector 14A onto the first area 30A and the third cross-sectional sub-image 32C from the second projector 14B onto the third area 30C. During the second projecting operation, neither the first projector 14A nor the second projector 14B projects the second cross-sectional sub-image 32B onto the second area 30B. The controller 16 performs the first projecting operation and the second projecting operation so as to equalize the number of times the first to third cross-sectional sub-images 32A to 32C are respectively projected onto the first to third areas 30A to 30C. Thus, equal or substantially equal total amounts of optical energy are applied to the photo-curable resin 23 for the second area 30B onto which the second cross-sectional sub-image 32B is projected from each of the first projector 14A and the second projector 14B, the first area 30A onto which the first cross-sectional sub-image 32A is projected from only the first projector 14A, and the third area 30C onto which the third cross-sectional sub-image 32C is projected from only the second projector 14B. In other words, the photo-curable resin 23 is cured uniformly, reducing or eliminating variations in the degree of curing of the photo-curable resin 23. Consequently, the three-dimensional printing apparatus 10 (see FIG. 1) according to this preferred embodiment of the present invention reduces or eliminates variations in the degree of curing of the photo-curable resin 23 without adjusting the total amounts of optical energy to be applied from the first projector 14A and the second projector 14B.

In this preferred embodiment, the controller 16 initially performs the first projecting operation. This initially enables, as illustrated in FIG. 3, curing of the photo-curable resin 23 (see FIG. 1) across an entirety of the cross-sectional sub-images 32A and 32B (see FIG. 4) projected from the first projector 14A and the cross-sectional sub-images 32B and 32C (see FIG. 4) projected from the second projector 14B. Thus, a resin layer resulting from the curing of the photo-curable resin 23 will have a more stable shape.

In this preferred embodiment, the controller 16 alternately and repeatedly performs the first projecting operation and the second projecting operation. This enables gradual curing of an entirety of the photo-curable resin 23 (see FIG. 1). Consequently, a resin layer resulting from the curing of the photo-curable resin 23 will have a more stable shape.

Second Preferred Embodiment

Figure 6:
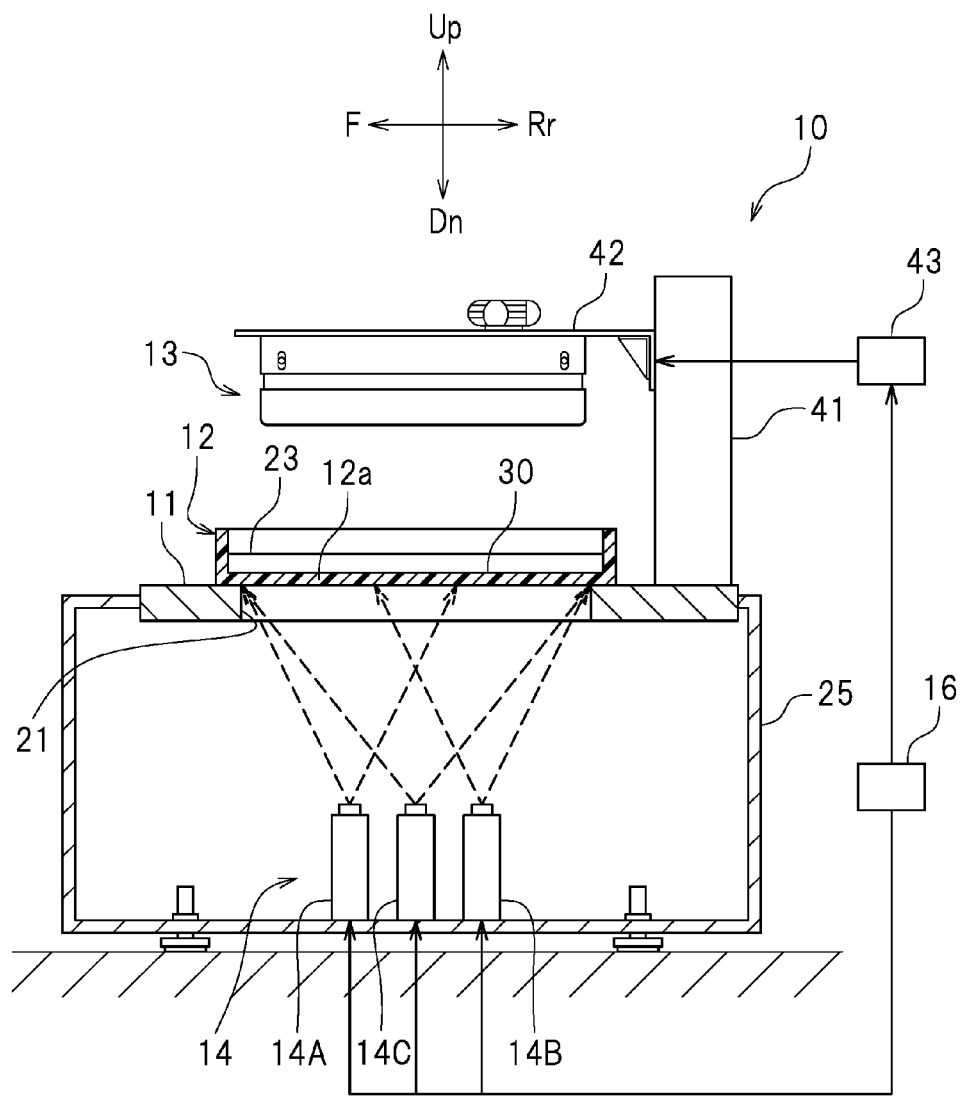
FIG. 6 is a cross-sectional view of a three-dimensional printing apparatus according to a second preferred embodiment of the present invention.

As illustrated in FIG. 6, the projector 14 preferably includes a third projector 14C in addition to the first projector 14A and the second projector 14B. The controller 16 is connected to the third projector 14C as well as to the first projector 14A and the second projector 14B. Similarly to the first projector 14A and the second projector 14B, the third projector 14C receives a cross-sectional image signal from the controller 16.

Figure 7:
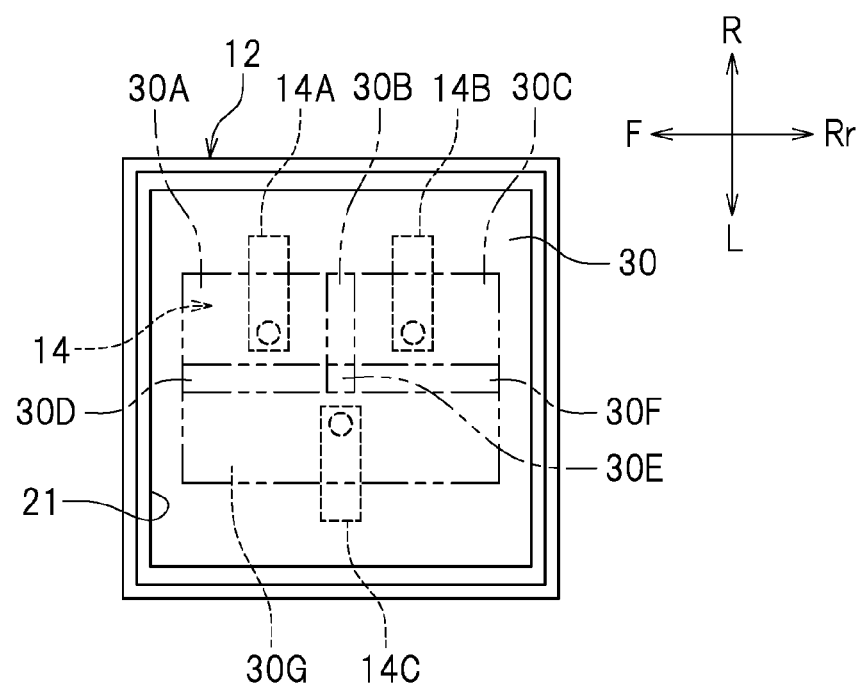
FIG. 7 is a schematic diagram illustrating areas of an image projecting surface according to the second preferred embodiment of the present invention.

As illustrated in FIG. 7, the image projecting surface 30 preferably includes the first area 30A, the second area 30B adjacent to the first area 30A, the third area 30C adjacent to the second area 30B, a fourth area 30D adjacent to the first area 30A, a fifth area 30E adjacent to the second area 30B and the fourth area 30D, a sixth area 30F adjacent to the third area 30C and the fifth area 30E, and a seventh area 30G adjacent to the fourth area 30D, the fifth area 30E, and the sixth area 30F. The fourth to sixth areas 30D to 30F are located leftward of the first to third areas 30A to 30C. The fourth to sixth areas 30D to 30F are located rightward of the seventh area 30G. The fourth to sixth areas 30D to 30F may be located rightward of the first to third areas 30A to 30C. The fourth to sixth areas 30D to 30F may be located leftward of the seventh area 30G. The fourth to sixth areas 30D to 30F may be located forward or rearward of the first to third areas 30A to 30C. The fourth to sixth areas 30D to 30F may be located forward or rearward of the seventh area 30G.

As illustrated in FIG. 7, the first projector 14A is capable of projecting cross-sectional sub-images onto the first area 30A, the second area 30B, the fourth area 30D, and the fifth area 30E. The second projector 14B is capable of projecting cross-sectional sub-images onto the second area 30B, the third area 30C, the fifth area 30E, and the sixth area 30F. The third projector 14C is capable of projecting cross-sectional sub-images onto the fourth area 30D, the fifth area 30E, the sixth area 30F, and the seventh area 30G. The first projector 14A applies light of a predetermined wavelength so as to project cross-sectional sub-images onto the first area 30A, the second area 30B, the fourth area 30D, and the fifth area 30E. The second projector 14B applies light of a predetermined wavelength so as to project cross-sectional sub-images onto the second area 30B, the third area 30C, the fifth area 30E, and the sixth area 30F. The third projector 14C applies light of a predetermined wavelength so as to project cross-sectional sub-images onto the fourth area 30D, the fifth area 30E, the sixth area 30F, and the seventh area 30G. The first projector 14A, the second projector 14B, and the third projector 14C apply equal or substantially equal total amounts of optical energy. Cross-sectional sub-images are projected from the first projector 14A, the second projector 14B, and the third projector 14C onto the photo-curable resin 23 in the tank 12 through the opening 21 of the table 11.

As illustrated in FIG. 6, the third projector 14C is disposed below the tank 12. The third projector 14C is housed in the case 25. As illustrated in FIG. 7, the third projector 14C is disposed leftward of the first projector 14A and the second projector 14B. The third projector 14C may be disposed rightward of the first projector 14A and the second projector 14B. The third projector 14C may be disposed forward or rearward of the first projector 14A and the second projector 14B. The first projector 14A, the second projector 14B, and the third projector 14C are disposed so that a set of the cross-sectional sub-images projected from the first projector 14A and a set of the cross-sectional sub-images projected from the second projector 14B partially overlap with each other in the second area 30B, so that a set of the cross-sectional sub-images projected from the first projector 14A and a set of the cross-sectional sub-images projected from the third projector 14C partially overlap with each other in the fourth area 30D, so that a set of the cross-sectional sub-images projected from the second projector 14B and a set of the cross-sectional sub-images projected from the third projector 14C partially overlap with each other in the sixth area 30F, and so that a set of the cross-sectional sub-images projected from the first projector 14A, a set of the cross-sectional sub-images projected from the second projector 14B, and a set of the cross-sectional sub-images projected from the third projector 14C partially overlap with each other in the fifth area 30E. In other words, no gaps exist between a set of the cross-sectional sub-images projected from the first projector 14A, a set of the cross-sectional sub-images projected from the second projector 14B, and a set of the cross-sectional sub-images projected from the third projector 14C.

Figure 8:
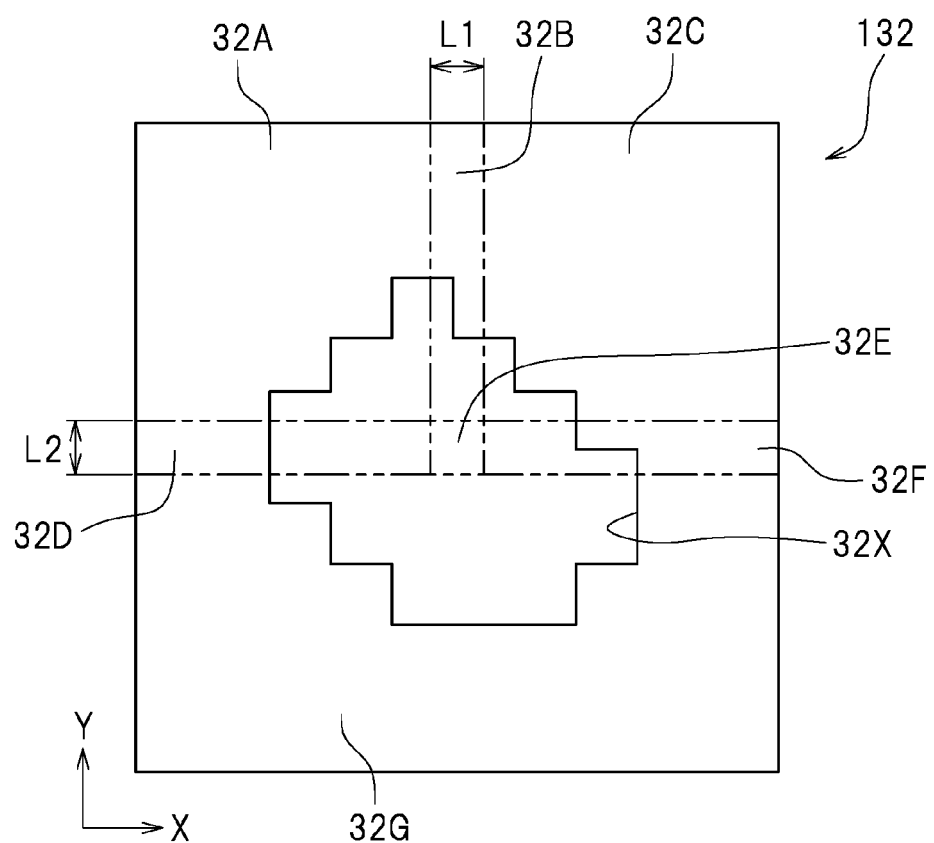
FIG. 8 is a schematic diagram illustrating a cross-sectional image according to the second preferred embodiment of the present invention.

FIG. 8 illustrates one of cross-sectional images 132 projected from the first projector 14A, the second projector 14B, and the third projector 14C onto the image projecting surface 30. Each cross-sectional image 132 preferably include the first cross-sectional sub-image 32A projected onto the first area 30A (see FIG. 7), the second cross-sectional sub-image 32B projected onto the second area 30B (see FIG. 7), the third cross-sectional sub-image 32C projected onto the third area 30C (see FIG. 7), a fourth cross-sectional sub-image 32D projected onto the fourth area 30D (see FIG. 7), a fifth cross-sectional sub-image 32E projected onto the fifth area 30E (see FIG. 7), a sixth cross-sectional sub-image 32F projected onto the sixth area 30F (see FIG. 7), and a seventh cross-sectional sub-image 32G projected onto the seventh area 30G (see FIG. 7). The fourth cross-sectional sub-image 32D has a Y-axis length L2 equivalent to $N_2$ pixel(s), where $N_2$ is an integer of 1 to 10, for example. The fifth cross-sectional sub-image 32E has an X-axis length L1 equivalent to $N_1$ pixel(s), where $N_1$ is an integer of 1 to 10, for example, and a Y-axis length L2 equivalent to $N_2$ pixel(s). The sixth cross-sectional sub-image 32F has a Y-axis length L2 equivalent to $N_2$ pixel(s). In this preferred embodiment, $N_1$ and $N_2$ are equal integers. Alternatively, $N_1$ and $N_2$ may be different integers. The controller 16 controls the first projector 14A, the second projector 14B, and the third projector 14C so that the cross-sectional images 132 are sequentially projected onto the image projecting surface 30 at predetermined time intervals. The chain double-dashed lines in FIG. 8 indicate boundaries between the first to seventh cross-sectional sub-images 32A to 32G.

The controller 16 controls the third projector 14C as well as the first projector 14A and the second projector 14B. The controller 16 controls, for example, the first to seventh cross-sectional sub-images 32A to 32G to be projected from the first, second, and third projectors 14A, 14B, and 14C, the timing of projection of the first to seventh cross-sectional sub-images 32A to 32G, and optical energy to be applied from the first, second, and third projectors 14A, 14B, and 14C.

The controller 16 performs, in addition to the first and second projecting operations, at least one of a third projecting operation, a fourth projecting operation, a fifth projecting operation, and a sixth projecting operation. The controller 16 according to this preferred embodiment performs the first projecting operation prior to the second to sixth projecting operations. Alternatively, the controller 16 may initially perform the second, third, fourth, fifth or sixth projecting operation.

As illustrated in FIG. 7, the first projecting operation involves simultaneously projecting cross-sectional sub-images from the first projector 14A onto the first area 30A, the second area 30B, the fourth area 30D, and the fifth area 30E, cross-sectional sub-images from the second projector 14B onto the second area 30B, the third area 30C, the fifth area 30E, and the sixth area 30F, and cross-sectional sub-images from the third projector 14C onto the fourth area 30D, the fifth area 30E, the sixth area 30F, and the seventh area 30G. Specifically, during the first projecting operation, the first projector 14A projects the first cross-sectional sub-image 32A (see FIG. 8) of the cross-sectional image 132 onto the first area 30A, projects the second cross-sectional sub-image 32B (see FIG. 8) onto the second area 30B, projects the fourth cross-sectional sub-image 32D (see FIG. 8) onto the fourth area 30D, and projects the fifth cross-sectional sub-image 32E (see FIG. 8) onto the fifth area 30E. During the first projecting operation, the second projector 14B projects the second cross-sectional sub-image 32B onto the second area 30B, projects the third cross-sectional sub-image 32C (see FIG. 8) onto the third area 30C, projects the fifth cross-sectional sub-image 32E (see FIG. 8) onto the fifth area 30E, and projects the sixth cross-sectional sub-image 32F (see FIG. 8) onto the sixth area 30F. During the first projecting operation, the third projector 14C projects the fourth cross-sectional sub-image 32D onto the fourth area 30D, projects the fifth cross-sectional sub-image 32E onto the fifth area 30E, projects the sixth cross-sectional sub-image 32F onto the sixth area 30F, and projects the seventh cross-sectional sub-image 32G (see FIG. 8) onto the seventh area 30G.

Figure 9:
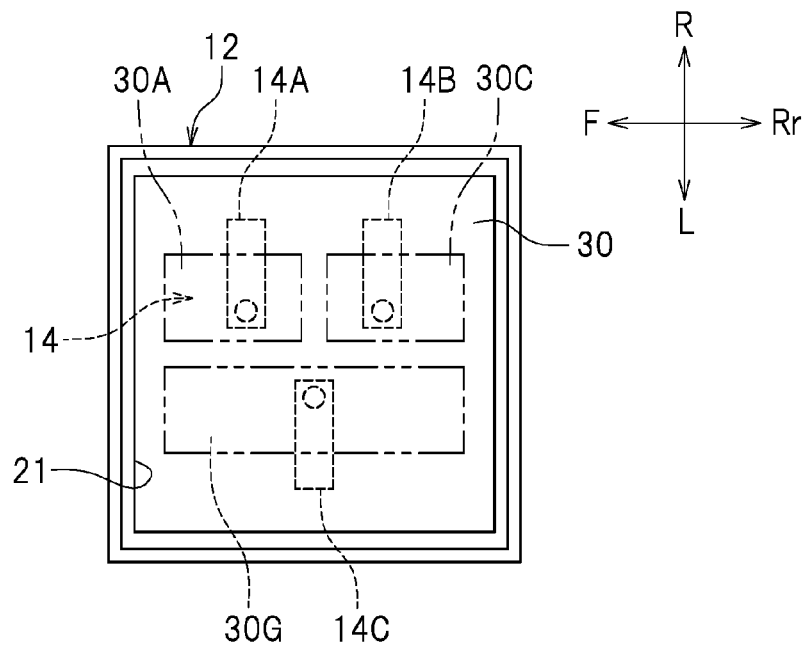
FIG. 9 is a schematic diagram illustrating the areas of the image projecting surface according to the second preferred embodiment of the present invention.

As illustrated in FIG. 9, the second projecting operation involves simultaneously projecting a cross-sectional sub-image from the first projector 14A onto the first area 30A, a cross-sectional sub-image from the second projector 14B onto the third area 30C, and a cross-sectional sub-image from the third projector 14C onto the seventh area 30G. Specifically, during the second projecting operation, the first projector 14A projects the first cross-sectional sub-image 32A onto the first area 30A without projecting the second cross-sectional sub-image 32B onto the second area 30B, the fourth cross-sectional sub-image 32D onto the fourth area 30D, or the fifth cross-sectional sub-image 32E onto the fifth area 30E. During the second projecting operation, the second projector 14B projects the third cross-sectional sub-image 32C onto the third area 30C without projecting the second cross-sectional sub-image 32B onto the second area 30B, the fifth cross-sectional sub-image 32E onto the fifth area 30E, or the sixth cross-sectional sub-image 32F onto the sixth area 30F. During the second projecting operation, the third projector 14C projects the seventh cross-sectional sub-image 32G onto the seventh area 30G without projecting the fourth cross-sectional sub-image 32D onto the fourth area 30D, the fifth cross-sectional sub-image 32E onto the fifth area 30E, or the sixth cross-sectional sub-image 32F onto the sixth area 30F.

Figure 10:
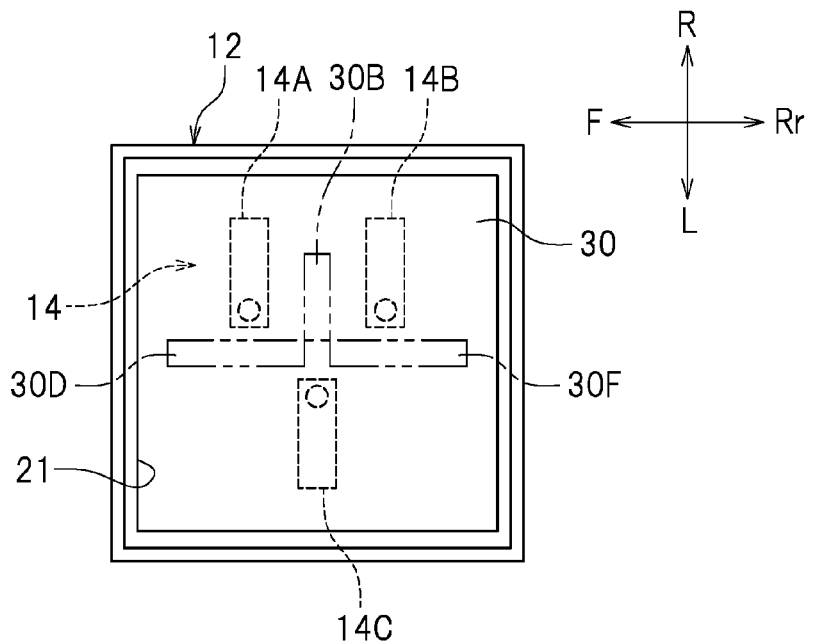
FIG. 10 is a schematic diagram illustrating the areas of the image projecting surface according to the second preferred embodiment of the present invention.

As illustrated in FIG. 10, the third projecting operation involves simultaneously projecting a cross-sectional sub-image from the first projector 14A onto the second area 30B, a cross-sectional sub-image from the second projector 14B onto the sixth area 30F, and a cross-sectional sub-image from the third projector 14C onto the fourth area 30D. Specifically, during the third projecting operation, the first projector 14A projects the second cross-sectional sub-image 32B onto the second area 30B without projecting the first cross-sectional sub-image 32A onto the first area 30A, the fourth cross-sectional sub-image 32D onto the fourth area 30D, or the fifth cross-sectional sub-image 32E onto the fifth area 30E. During the third projecting operation, the second projector 14B projects the sixth cross-sectional sub-image 32F onto the sixth area 30F without projecting the second cross-sectional sub-image 32B onto the second area 30B, the third cross-sectional sub-image 32C onto the third area 30C, or the fifth cross-sectional sub-image 32E onto the fifth area 30E. During the third projecting operation, the third projector 14C projects the fourth cross-sectional sub-image 32D onto the fourth area 30D without projecting the fifth cross-sectional sub-image 32E onto the fifth area 30E, the sixth cross-sectional sub-image 32F onto the sixth area 30F, or the seventh cross-sectional sub-image 32G onto the seventh area 30G.

As illustrated in FIG. 10, the fourth projecting operation involves simultaneously projecting a cross-sectional sub-image from the first projector 14A onto the fourth area 30D, a cross-sectional sub-image from the second projector 14B onto the second area 30B, and a cross-sectional sub-image from the third projector 14C onto the sixth area 30F. Specifically, during the fourth projecting operation, the first projector 14A projects the fourth cross-sectional sub-image 32D onto the fourth area 30D without projecting the first cross-sectional sub-image 32A onto the first area 30A, the second cross-sectional sub-image 32B onto the second area 30B, or the fifth cross-sectional sub-image 32E onto the fifth area 30E. During the fourth projecting operation, the second projector 14B projects the second cross-sectional sub-image 32B onto the second area 30B without projecting the third cross-sectional sub-image 32C onto the third area 30C, the fifth cross-sectional sub-image 32E onto the fifth area 30E, or the sixth cross-sectional sub-image 32F onto the sixth area 30F. During the fourth projecting operation, the third projector 14C projects the sixth cross-sectional sub-image 32F onto the sixth area 30F without projecting the fourth cross-sectional sub-image 32D onto the fourth area 30D, the fifth cross-sectional sub-image 32E onto the fifth area 30E, or the seventh cross-sectional sub-image 32G onto the seventh area 30G.

As illustrated in FIG. 7, the fifth projecting operation involves simultaneously projecting cross-sectional sub-images from the first projector 14A onto the first area 30A and the fourth area 30D, cross-sectional sub-images from the second projector 14B onto the second area 30B and the third area 30C, and cross-sectional sub-images from the third projector 14C onto the sixth area 30F and the seventh area 30G. Specifically, during the fifth projecting operation, the first projector 14A simultaneously projects the first cross-sectional sub-image 32A and the fourth cross-sectional sub-image 32D onto the first area 30A and the fourth area 30D, respectively, without projecting the second cross-sectional sub-image 32B onto the second area 30B or the fifth cross-sectional sub-image 32E onto the fifth area 30E. During the fifth projecting operation, the second projector 14B simultaneously projects the second cross-sectional sub-image 32B and the third cross-sectional sub-image 32C onto the second area 30B and the third area 30C, respectively, without projecting the fifth cross-sectional sub-image 32E onto the fifth area 30E or the sixth cross-sectional sub-image 32F onto the sixth area 30F. During the fifth projecting operation, the third projector 14C simultaneously projects the sixth cross-sectional sub-image 32F and the seventh cross-sectional sub-image 32G onto the sixth area 30F and the seventh area 30G, respectively, without projecting the fourth cross-sectional sub-image 32D onto the fourth area 30D or the fifth cross-sectional sub-image 32E onto the fifth area 30E.

As illustrated in FIG. 7, the sixth projecting operation involves simultaneously projecting cross-sectional sub-images from the first projector 14A onto the first area 30A and the second area 30B; cross-sectional sub-images from the second projector 14B onto the third area 30C and the sixth area 30F, and cross-sectional sub-images from the third projector 14C onto the fourth area 30D and the seventh area 30G. Specifically, during the sixth projecting operation, the first projector 14A simultaneously projects the first cross-sectional sub-image 32A and the second cross-sectional sub-image 32B onto the first area 30A and the second area 30B, respectively, without projecting the fourth cross-sectional sub-image 32D onto the fourth area 30D or the fifth cross-sectional sub-image 32E onto the fifth area 30E. During the sixth projecting operation, the second projector 14B simultaneously projects the third cross-sectional sub-image 32C and the sixth cross-sectional sub-image 32F onto the third area 30C and the sixth area 30F, respectively, without projecting the second cross-sectional sub-image 32B onto the second area 30B or the fifth cross-sectional sub-image 32E onto the fifth area 30E. During the sixth projecting operation, the third projector 14C simultaneously projects the fourth cross-sectional sub-image 32D and the seventh cross-sectional sub-image 32G onto the fourth area 30D and the seventh area 30G, respectively, without projecting the fifth cross-sectional sub-image 32E onto the fifth area 30E or the sixth cross-sectional sub-image 32F onto the sixth area 30F.

The controller 16 equalizes the number of times the first cross-sectional sub-image 32A is to be projected onto the first area 30A, the number of times the second cross-sectional sub-image 32B is to be projected onto the second area 30B, the number of times the third cross-sectional sub-image 32C is to be projected onto the third area 30C, the number of times the fourth cross-sectional sub-image 32D is to be projected onto the fourth area 30D, the number of times the fifth cross-sectional sub-image 32E is to be projected onto the fifth area 30E, the number of times the sixth cross-sectional sub-image 32F is to be projected onto the sixth area 30F, and the number of times the seventh cross-sectional sub-image 32G is to be projected onto the seventh area 30G.

Specifically, when the controller 16 performs, for example, the third projecting operation or the fourth projecting operation, the number of times the first projecting operation is to be performed and the number of times the third projecting operation or the fourth projecting operation is to be performed are equal or substantially equal to each other, and the number of times the second projecting operation is to be performed is twice the number of times the first projecting operation is to be performed. When the controller 16 performs, for example, the fifth projecting operation or the sixth projecting operation, the number of times the first projecting operation is to be performed, the number of times the second projecting operation is to be performed, and the number of times the fifth projecting operation or the sixth projecting operation is to be performed are equal to each other.

The controller 16 sets the total amounts of optical energy to be applied from the first projector 14A, the second projector 14B, and the third projector 14C so that the photo-curable resin 23 is cured when the first to seventh cross-sectional sub-images 32A to 32G are respectively projected onto the first to seventh areas 30A to 30G a predetermined number of times. For example, when the controller 16 performs each of the first projecting operation, the second projecting operation, and the fifth projecting operation once, the number of times the first to seventh cross-sectional sub-images 32A to 32G are respectively projected onto the first to seventh areas 30A to 30G is three times. Thus, the controller 16 sets the total amounts of optical energy to be applied from the first projector 14A, the second projector 14B, and the third projector 14C so that the photo-curable resin 23 is cured when the first to seventh cross-sectional sub-images 32A to 32G are respectively projected onto the first to seventh areas 30A to 30G three times.

As illustrated in FIG. 7, the projector 14 according to this preferred embodiment preferably includes the first projector 14A, the second projector 14B, and the third projector 14C. This enables the projector 14 to project the cross-sectional image 132 (see FIG. 8), which is larger in size, onto the image projecting surface 30. This preferred embodiment leaves no gaps between a set of the cross-sectional sub-images 32A, 32B, 32D, and 32E projected from the first projector 14A, a set of the cross-sectional sub-images 32B, 32C, 32E, and 32F projected from the second projector 14B, and a set of the cross-sectional sub-images 32D, 32E, 32F, and 32G projected from the third projector 14C, thus enabling reliable curing of the photo-curable resin 23 (see FIG. 6) across an entirety of the first to seventh cross-sectional sub-images 32A to 32G. This preferred embodiment equalizes the total amounts of optical energy to be applied to the photo-curable resin 23 across the first to seventh areas 30A to 30G, thus uniformizing the degree of curing of the photo-curable resin 23. Consequently, this preferred embodiment reduces or eliminates variations in the degree of curing of the photo-curable resin 23.

In this preferred embodiment, the controller 16 initially performs the first projecting operation. This initially enables, as illustrated in FIG. 7, curing of the photo-curable resin 23 (see FIG. 6) across an entirety of the cross-sectional sub-images 32A, 32B, 32D, and 32E projected from the first projector 14A, the cross-sectional sub-images 32B, 32C, 32E, and 32F projected from the second projector 14B, and the cross-sectional sub-images 32D, 32E, 32F, and 32G projected from the third projector 14C. Thus, a resin layer resulting from the curing of the photo-curable resin 23 will have a more stable shape.

Third Preferred Embodiment

Figure 11:
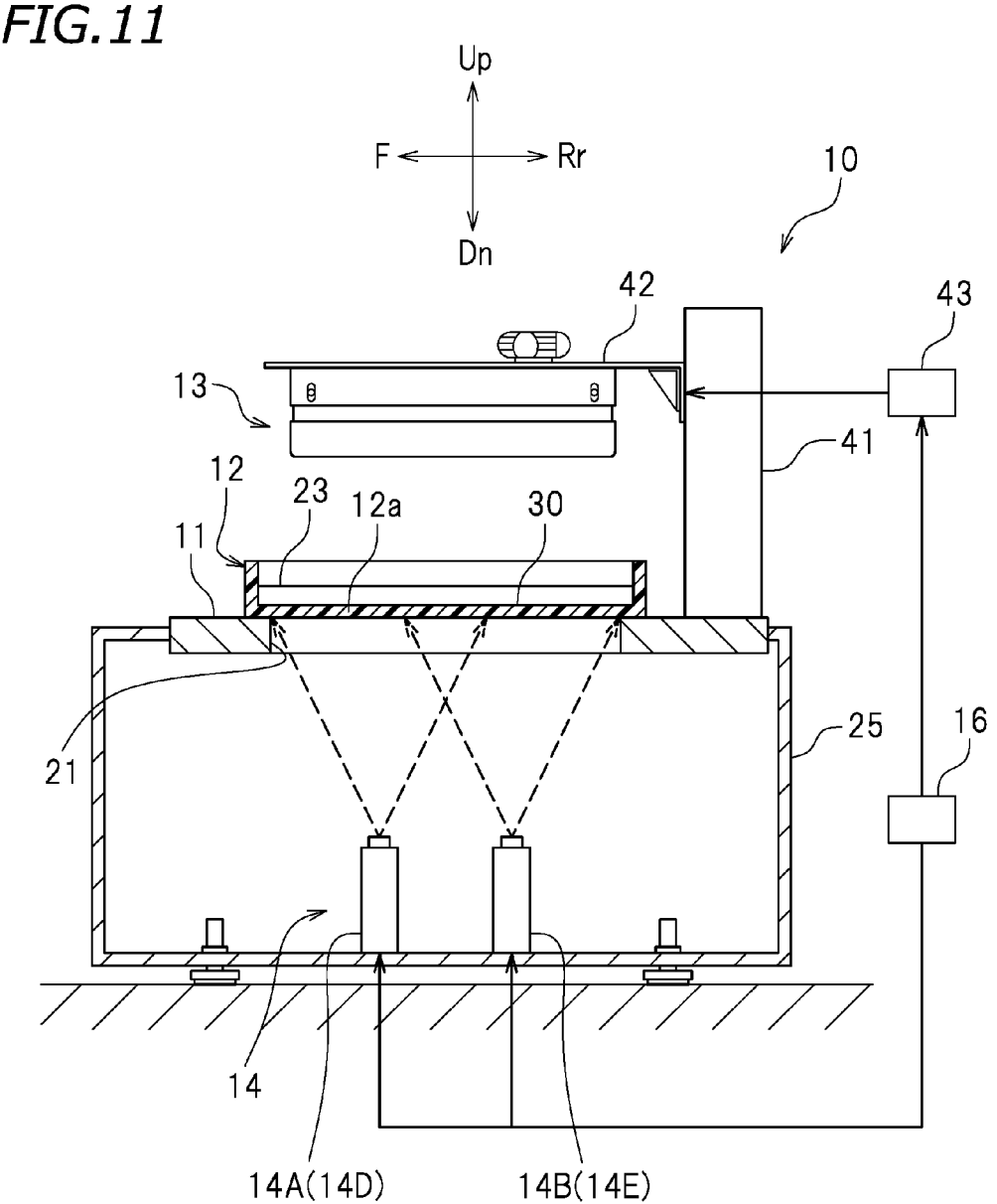
FIG. 11 is a cross-sectional view of a three-dimensional printing apparatus according to a third preferred embodiment of the present invention.

As illustrated in FIG. 11, the projector 14 preferably includes a fourth projector 14D and a fifth projector 14E in addition to the first projector 14A and the second projector 14B. The controller 16 is connected to the fourth projector 14D and the fifth projector 14E as well as to the first projector 14A and the second projector 14B. Similarly to the first projector 14A and the second projector 14B, the fourth projector 14D and the fifth projector 14E each receive a cross-sectional image signal from the controller 16. Component or elements similar to those in the second preferred embodiment will be omitted as unnecessary.

Figure 12:
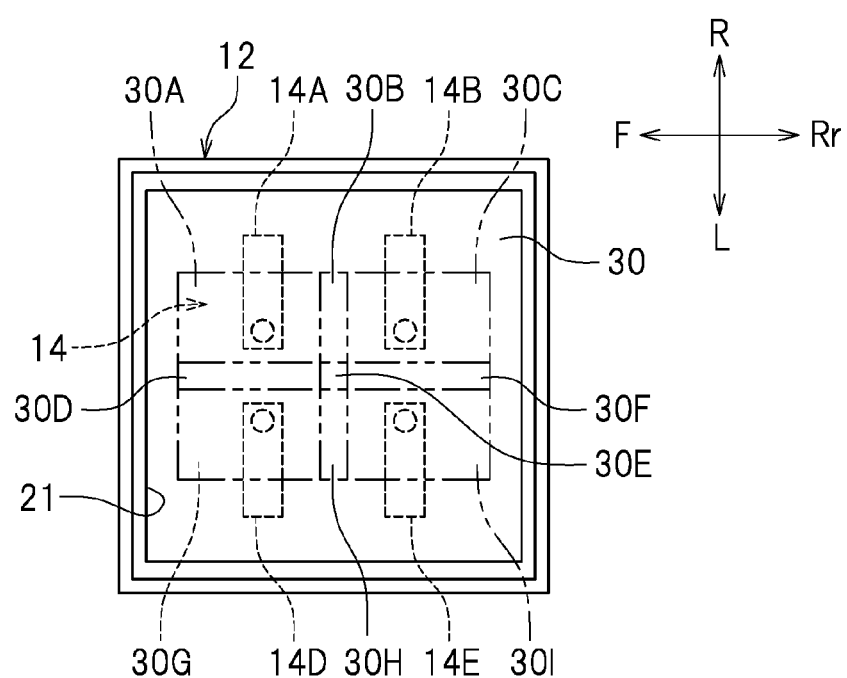
FIG. 12 is a schematic diagram illustrating areas of an image projecting surface according to the third preferred embodiment of the present invention.

As illustrated in FIG. 12, the image projecting surface 30 preferably includes the first area 30A, the second area 30B adjacent to the first area 30A, the third area 30C adjacent to the second area 30B, the fourth area 30D adjacent to the first area 30A, the fifth area 30E adjacent to the second area 30B and the fourth area 30D, the sixth area 30F adjacent to the third area 30C and the fifth area 30E, the seventh area 30G adjacent to the fourth area 30D, an eighth area 30H adjacent to the fifth area 30E and the seventh area 30G, and a ninth area 30I adjacent to the sixth area 30F and the eighth area 30H. The fourth to sixth areas 30D to 30F are located leftward of the first to third areas 30A to 30C. The fourth to sixth areas 30D to 30F are located rightward of the seventh to ninth areas 30G to 30I. The fourth to sixth areas 30D to 30F may be located rightward of the first to third areas 30A to 30C. The fourth to sixth areas 30D to 30F may be located leftward of the seventh to ninth areas 30G to 30I. The fourth to sixth areas 30D to 30F may be located forward or rearward of the first to third areas 30A to 30C. The fourth to sixth areas 30D to 30F may be located forward or rearward of the seventh to ninth areas 30G to 30I.

The fourth projector 14D is capable of projecting cross-sectional sub-images onto the fourth area 30D, the fifth area 30E, the seventh area 30G, and the eighth area 30H. The fifth projector 14E is capable of projecting cross-sectional sub-images onto the fifth area 30E, the sixth area 30F, the eighth area 30H, and the ninth area 30I. The fourth projector 14D applies light of a predetermined wavelength so as to project cross-sectional sub-images onto the fourth area 30D, the fifth area 30E, the seventh area 30G, and the eighth area 30H. The fifth projector 14E applies light of a predetermined wavelength so as to project cross-sectional sub-images onto the fifth area 30E, the sixth area 30F, the eighth area 30H, and the ninth area 30I. The first projector 14A, the second projector 14B, the fourth projector 14D, and the fifth projector 14E apply equal or substantially equal total amounts of optical energy. Cross-sectional sub-images are projected from the first projector 14A, the second projector 14B, the fourth projector 14D, and the fifth projector 14E onto the photo-curable resin 23 in the tank 12 through the opening 21 of the table 11.

As illustrated in FIG. 11, the fourth projector 14D and the fifth projector 14E are disposed below the tank 12. The fourth projector 14D and the fifth projector 14E are housed in the case 25. As illustrated in FIG. 12, the fourth projector 14D is disposed leftward of the first projector 14A. The fourth projector 14D may be disposed rightward of the first projector 14A. The fifth projector 14E is disposed leftward of the second projector 14B. The fifth projector 14E may be disposed rightward of the second projector 14B. The fourth projector 14D and the fifth projector 14E may be disposed forward or rearward of the first projector 14A and the second projector 14B. The first projector 14A, the second projector 14B, the fourth projector 14D, and the fifth projector 14E are disposed so that a set of the cross-sectional sub-images projected from the first projector 14A and a set of the cross-sectional sub-images projected from the second projector 14B partially overlap with each other in the second area 30B, so that a set of the cross-sectional sub-images projected from the first projector 14A and a set of the cross-sectional sub-images projected from the fourth projector 14D partially overlap with each other in the fourth area 30D, so that a set of the cross-sectional sub-images projected from the second projector 14B and a set of the cross-sectional sub-images projected from the fifth projector 14E partially overlap with each other in the sixth area 30F, so that a set of the cross-sectional sub-mages projected from the fourth projector 14D and a set of the cross-sectional sub-images projected from the fifth projector 14E partially overlap with each other in the eighth area 30H, and so that a set of the cross-sectional sub-images projected from the first projector 14A, a set of the cross-sectional sub-images projected from the second projector 14B, a set of the cross-sectional sub-images projected from the fourth projector 14D, and a set of the cross-sectional sub-images projected from the fifth projector 14E partially overlap with each other in the fifth area 30E. In other words, no gaps exist between a set of the cross-sectional sub-images projected from the first projector 14A, a set of the cross-sectional sub-images projected from the second projector 14B, a set of the cross-sectional sub-images projected from the fourth projector 14D, and a set of the cross-sectional sub-images projected from the fifth projector 14E.

Figure 13:
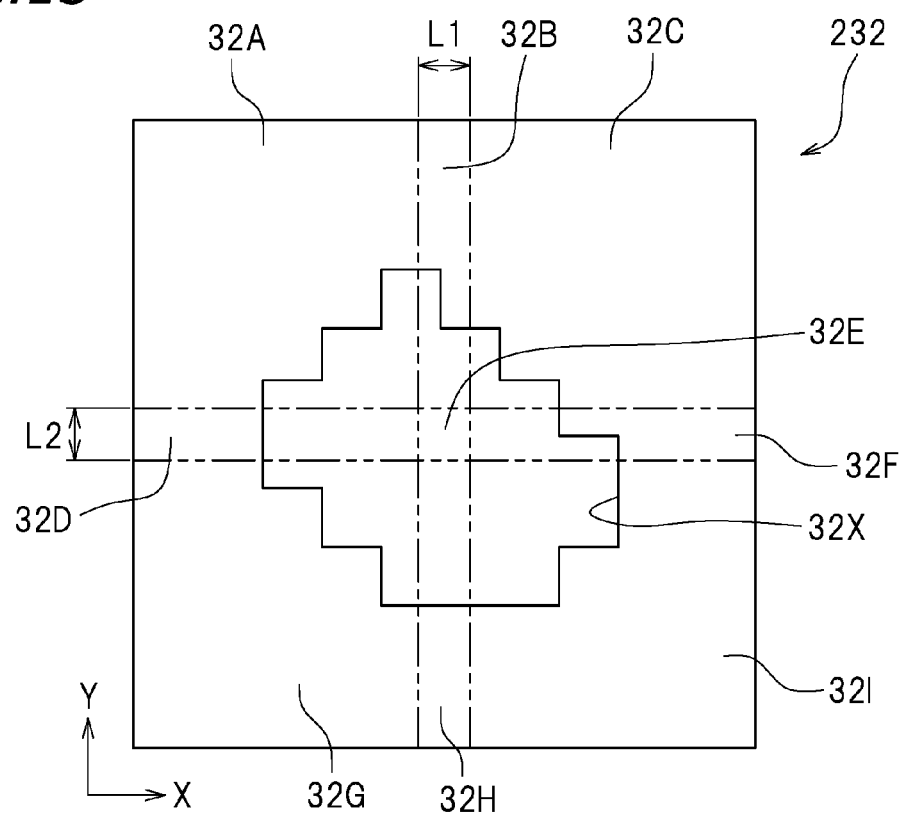
FIG. 13 is a schematic diagram illustrating a cross-sectional image according to the third preferred embodiment of the present invention.

FIG. 13 illustrates one of cross-sectional images 232 projected from the first projector 14A, the second projector 14B, the fourth projector 14D, and the fifth projector 14E onto the image projecting surface 30. Each cross-sectional image 232 preferably includes the first cross-sectional sub-image 32A projected onto the first area 30A (see FIG. 12), the second cross-sectional sub-image 32B projected onto the second area 30B (see FIG. 12), the third cross-sectional sub-image 32C projected onto the third area 30C (see FIG. 12), the fourth cross-sectional sub-image 32D projected onto the fourth area 30D (see FIG. 12), the fifth cross-sectional sub-image 32E projected onto the fifth area 30E (see FIG. 12), the sixth cross-sectional sub-image 32F projected onto the sixth area 30F (see FIG. 12), the seventh cross-sectional sub-image 32G projected onto the seventh area 30G (see FIG. 12), an eighth cross-sectional sub-image 32H projected onto the eighth area 30H (see FIG. 12), and a ninth cross-sectional sub-image 32I projected onto the ninth area 30I (see FIG. 12). The fourth cross-sectional sub-image 32D has a Y-axis length L2 equivalent to $N_2$ pixel(s), where $N_2$ is an integer of 1 to 10, for example. The fifth cross-sectional sub-image 32E has an X-axis length L1 equivalent to $N_1$ pixel(s), where $N_1$ is an integer of 1 to 10, for example, and a Y-axis length L2 equivalent to $N_2$ pixel (s). The sixth cross-sectional sub-image 32F has a Y-axis length L2 equivalent to $N_2$ pixel(s). The eighth cross-sectional sub-image 32H has an X-axis length L1 equivalent to $N_1$ pixel(s). In this preferred embodiment, $N_1$ and $N_2$ are equal integers. Alternatively, $N_1$ and $N_2$ may be different integers. The controller 16 controls the first projector 14A, the second projector 14B, the fourth projector 14D, and the fifth projector 14E so that the cross-sectional images 232 are sequentially projected onto the image projecting surface 30 at predetermined time intervals. The chain double-dashed lines in FIG. 13 indicate boundaries between the first to ninth cross-sectional sub-images 32A to 32I.

The controller 16 controls the fourth projector 14D and the fifth projector 14E as well as the first projector 14A and the second projector 14B. The controller 16 controls, for example, the first to ninth cross-sectional sub-images 32A to 32I to be projected from the first, second, fourth, and fifth projectors 14A, 14B, 14D, and 14E, the timing of projection of the first to ninth cross-sectional sub-images 32A to 32I, and optical energy to be applied from the first, second, fourth, and fifth projectors 14A, 14B, 14D, and 14E.

The controller 16 performs, in addition to the first and second projecting operations, at least one of a seventh projecting operation and an eighth projecting operation. The controller 16 according to this preferred embodiment performs the first projecting operation prior to the second projecting operation, the seventh projecting operation, and the eighth projecting operation. Alternatively, the controller 16 may initially perform the second, seventh or eighth projecting operation.

As illustrated in FIG. 12, the first projecting operation involves simultaneously projecting cross-sectional sub-images from the first projector 14A onto the first area 30A, the second area 30B, the fourth area 30D, and the fifth area 30E, cross-sectional sub-images from the second projector 14B onto the second area 30B, the third area 30C, the fifth area 30E, and the sixth area 30F, cross-sectional sub-images from the fourth projector 14D onto the fourth area 30D, the fifth area 30E, the seventh area 30G, and the eighth area 30H, and cross-sectional sub-images from the fifth projector 14E onto the fifth area 30E, the sixth area 30F, the eighth area 30H, and the ninth area 30I. During the first projecting operation, the fourth projector 14D projects the fourth cross-sectional sub-image 32D (see FIG. 13) onto the fourth area 30D, projects the fifth cross-sectional sub-image 32E (see FIG. 13) onto the fifth area 30E, projects the seventh cross-sectional sub-image 32G (see FIG. 13) onto the seventh area 30G, and projects the eighth cross-sectional sub-image 32H (see FIG. 13) onto the eighth area 30H. During the first projecting operation, the fifth projector 14E projects the fifth cross-sectional sub-image 32E onto the fifth area 30E, projects the sixth cross-sectional sub-image 32F (see FIG. 13) onto the sixth area 30F, projects the eighth cross-sectional sub-image 32H onto the eighth area 30H, and projects the ninth cross-sectional sub-image 32I (see FIG. 13) onto the ninth area 30I.

Figure 14:
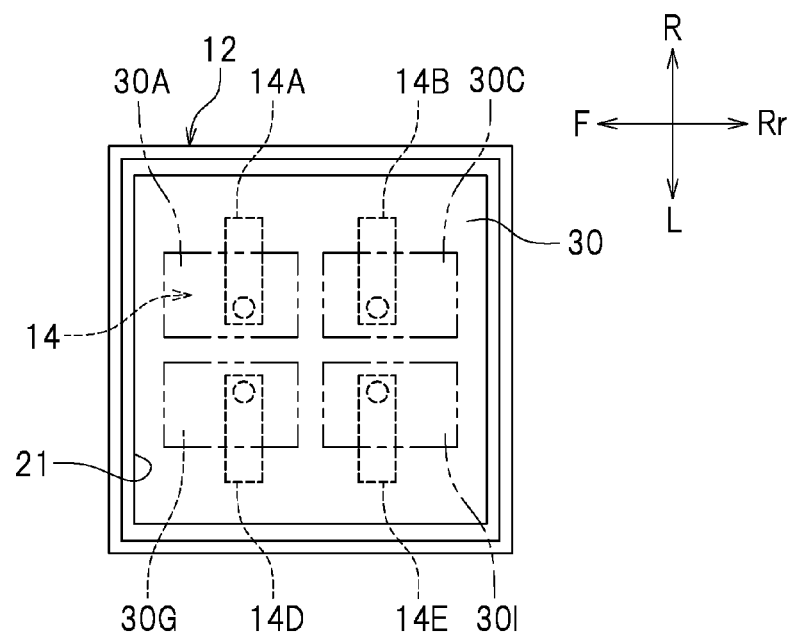
FIG. 14 is a schematic diagram illustrating the areas of the image projecting surface according to the third preferred embodiment of the present invention.

As illustrated in FIG. 14, the second projecting operation involves simultaneous projecting a cross-sectional sub-image from the first projector 14A onto the first area 30A, a cross-sectional sub-image from the second projector 14B onto the third area 30C, a cross-sectional sub-image from the fourth projector 14D onto the seventh area 30G, and a cross-sectional sub-image from the fifth projector 14E onto the ninth area 30I. During the second projecting operation, the fourth projector 14D projects the seventh cross-sectional sub-image 32G onto the seventh area 30G without projecting the fourth cross-sectional sub-image 32D onto the fourth area 30D, the fifth cross-sectional sub-image 32E onto the fifth area 30E, or the eighth cross-sectional sub-image 32H onto the eighth area 30H. During the second projecting operation, the fifth projector 14E projects the ninth cross-sectional sub-image 32I onto the ninth area 30I without projecting the fifth cross-sectional sub-image 32E onto the fifth area 30E, the sixth cross-sectional sub-image 32F onto the sixth area 30F, or the eighth cross-sectional sub-image 32H onto the eighth area 30H.

Figure 15:
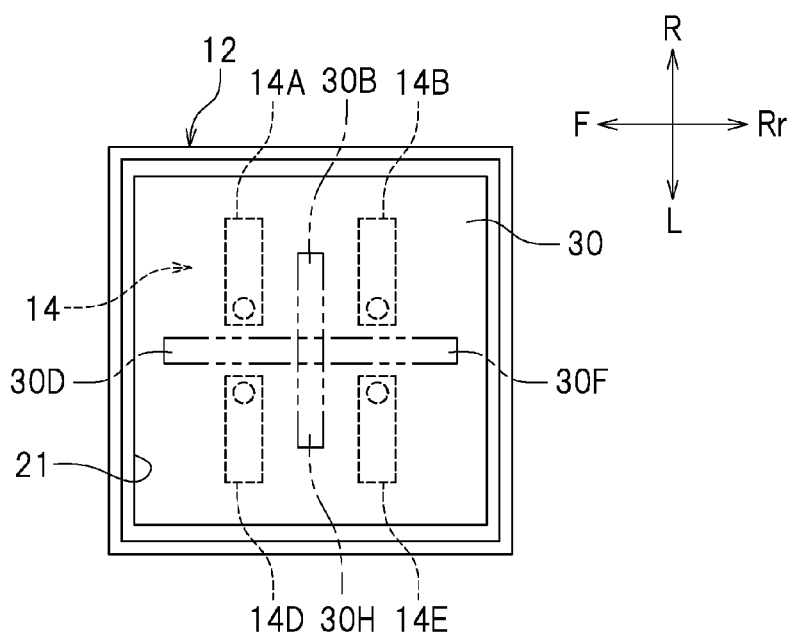
FIG. 15 is a schematic diagram illustrating the areas of the image projecting surface according to the third preferred embodiment of the present invention.

As illustrated in FIG. 15, the seventh projecting operation involves simultaneously projecting a cross-sectional sub-image from the first projector 14A onto the second area 30B, a cross-sectional sub-image from the second projector 14B onto the sixth area 30F, a cross-sectional sub-image from the fourth projector 14D onto the fourth area 30D, and a cross-sectional sub-image from the fifth projector 14E onto the eighth area 30H. Specifically, during the seventh projecting operation, the first projector 14A projects the second cross-sectional sub-image 32B onto the second area 30B without projecting the first cross-sectional sub-image 32A onto the first area 30A, the fourth cross-sectional sub-image 32D onto the fourth area 30D, or the fifth cross-sectional sub-image 32E onto the fifth area 30E. During the seventh projecting operation, the second projector 14B projects the sixth cross-sectional sub-image 32F onto the sixth area 30F without projecting the second cross-sectional sub-image 32B onto the second area 30B, the third cross-sectional sub-image 32C onto the third area 30C, or the fifth cross-sectional sub-image 32E onto the fifth area 30E. During the seventh projecting operation, the fourth projector 14D projects the fourth cross-sectional sub-image 32D onto the fourth area 30D without projecting the fifth cross-sectional sub-image 32E onto the fifth area 30E, the seventh cross-sectional sub-image 32G onto the seventh area 30G, or the eighth cross-sectional sub-image 32H onto the eighth area 30H. During the seventh projecting operation, the fifth projector 14E projects the eighth cross-sectional sub-image 32H onto the eighth area 30H without projecting the fifth cross-sectional sub-image 32E onto the fifth area 30E, the sixth cross-sectional sub-image 32F onto the sixth area 30F, or the ninth cross-sectional sub-image 32I onto the ninth area 30I. Alternatively, the seventh projecting operation may involve simultaneously projecting a cross-sectional sub-image from the first projector 14A onto the fourth area 30D, a cross-sectional sub-image from the second projector 14B onto the second area 30B, a cross-sectional sub-image from the fourth projector 14D onto the eighth area 30H, and a cross-sectional sub-image from the fifth projector 14E onto the sixth area 30F.

As illustrated in FIG. 12, the eighth projecting operation involves simultaneously projecting cross-sectional sub-images from the first projector 14A onto the first area 30A and the fourth area 30D, cross-sectional sub-images from the second projector 14B onto the second area 30B and the third area 30C, cross-sectional sub-images from the fourth projector 14D onto the seventh area 30G and the eighth area 30H, and cross-sectional sub-images from the fifth projector 14E onto the sixth area 30F and the ninth area 30I. Specifically, during the eighth projecting operation, the first projector 14A simultaneously projects the first cross-sectional sub-image 32A and the fourth cross-sectional sub-image 32D onto the first area 30A and the fourth area 30D, respectively, without projecting the second cross-sectional sub-image 32B onto the second area 30B or the fifth cross-sectional sub-image 32E onto the fifth area 30E. During the eighth projecting operation, the second projector 14B simultaneously projects the second cross-sectional sub-image 32B and the third cross-sectional sub-image 32C onto the second area 30B and the third area 30C, respectively, without projecting the fifth cross-sectional sub-image 32E onto the fifth area 30E or the sixth cross-sectional sub-image 32F onto the sixth area 30F. During the eighth projecting operation, the fourth projector 14D simultaneously projects the seventh cross-sectional sub-image 32G and the eighth cross-sectional sub-image 32H onto the seventh area 30G and the eighth area 30H, respectively, without projecting the fourth cross-sectional sub-image 32D onto the fourth area 30D or the fifth cross-sectional sub-image 32E onto the fifth area 30E. During the eighth projecting operation, the fifth projector 14E simultaneously projects the sixth cross-sectional sub-image 32F and the ninth cross-sectional sub-image 32I onto the sixth area 30F and the ninth area 30I, respectively, without projecting the fifth cross-sectional sub-image 32E onto the fifth area 30E or the eighth cross-sectional sub-image 32H onto the eighth area 30H. Alternatively, the eighth projecting operation may involve simultaneously projecting cross-sectional sub-images from the first projector 14A onto the first area 30A and the second area 30B, cross-sectional sub-images from the second projector 14B onto the third area 30C and the sixth area 30F, cross-sectional sub-images from the fourth projector 14D onto the fourth area 30D and the seventh area 30G, and cross-sectional sub-images from the fifth projector 14E onto the eighth area 30H and the ninth area 30I.

The controller 16 equalizes the number of times the first cross-sectional sub-image 32A is to be projected onto the first area 30A, the number of times the second cross-sectional sub-image 32B is to be projected onto the second area 30B, the number of times the third cross-sectional sub-image 32C is to be projected onto the third area 30C, the number of times the fourth cross-sectional sub-image 32D is to be projected onto the fourth area 30D, the number of times the fifth cross-sectional sub-image 32E is to be projected onto the fifth area 30E, the number of times the sixth cross-sectional sub-image 32F is to be projected onto the sixth area 30F, the number of times the seventh cross-sectional sub-image 32G is to be projected onto the seventh area 30G, the number of times the eighth cross-sectional sub-image 32H is to be projected onto the eighth area 30H, and the number of times the ninth cross-sectional sub-image 32I is to be projected onto the ninth area 30I.

Specifically, when the controller 16 performs, for example, the seventh projecting operation in addition to the first projecting operation and the second projecting operation, the number of times the seventh projecting operation is to be performed is twice the number of times the first projecting operation is to be performed, and the number of times the second projecting operation is to be performed is three times the number of times the first projecting operation is to be performed. When the controller 16 performs, for example, the eighth projecting operation in addition to the first projecting operation and the second projecting operation, the number of times the eighth projecting operation is to be performed is twice the number of times the first projecting operation is to be performed, and the number of times the second projecting operation is to be performed is equal to the number of times the first projecting operation is to be performed.

The controller 16 sets the total amounts of optical energy to be applied from the first projector 14A, the second projector 14B, the fourth projector 14D, and the fifth projector 14E so that the photo-curable resin 23 is cured when the first to ninth cross-sectional sub-images 32A to 32I are respectively projected onto the first to ninth areas 30A to 30I a predetermined number of times. For example, suppose that the controller 16 performs the first projecting operation once, the second projecting operation three times, and the seventh projecting operation twice. In this case, the first to ninth cross-sectional sub-images 32A to 32I are respectively projected onto the first to ninth areas 30A to 30I four times. Thus, the controller 16 sets the total amounts of optical energy to be applied from the first projector 14A, the second projector 14B, the fourth projector 14D, and the fifth projector 14E so that the photo-curable resin 23 is cured when the first to ninth cross-sectional sub-images 32A to 32I are respectively projected onto the first to ninth areas 30A to 30I four times.

As illustrated in FIG. 12, the projector 14 according to this preferred embodiment preferably includes the first projector 14A, the second projector 14B, the fourth projector 14D, and the fifth projector 14E. This enables the projector 14 to project the cross-sectional image 232 (see FIG. 13), which is larger in size, onto the image projecting surface 30. This preferred embodiment leaves no gaps between a set of the cross-sectional sub-images 32A, 32B, 32D, and 32E projected from the first projector 14A, a set of the cross-sectional sub-images 32B, 32C, 32E, and 32F projected from the second projector 14B, a set of the cross-sectional sub-images 32D, 32E, 32G, and 32H projected from the fourth projector 14D, and a set of the cross-sectional sub-images 32E, 32F, 32H, and 32I projected from the fifth projector 14E, thus enabling reliable curing of the photo-curable resin 23 (see FIG. 11) across an entirety of the first to ninth cross-sectional sub-images 32A to 32I. This preferred embodiment equalizes the total amounts of optical energy to be applied to the photo-curable resin 23 across the first to ninth areas 30A to 30I, thus uniformizing the degree of curing of the photo-curable resin 23. Consequently, this preferred embodiment reduces or eliminates variations in the degree of curing of the photo-curable resin 23.

The controller 16 according to this preferred embodiment initially performs the first projecting operation. This initially enables, as illustrated in FIG. 12, curing of the photo-curable resin 23 (see FIG. 11) across an entirety of the cross-sectional sub-images 32A, 32B, 32D, and 32E projected from the first projector 14A, the cross-sectional sub-images 32B, 32C, 32E, and 32F projected from the second projector 14B, the cross-sectional sub-images 32D, 32E, 32G, and 32H projected from the fourth projector 14D, and the cross-sectional sub-images 32E, 32F, 32H, and 32I projected from the fifth projector 14E. Thus, a resin layer resulting from the curing of the photo-curable resin 23 will have a more stable shape.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A three-dimensional printing apparatus that cures photo-curable resin so as to sequentially stack resin layers each having a predetermined cross-sectional shape, thus printing a three-dimensional object, the apparatus comprising:
   a tank that stores photo-curable resin, the tank including an image projecting surface that is an interface of the tank with the photo-curable resin;
   a projector that projects a cross-sectional image onto the image projecting surface, the cross-sectional image representing a predetermined cross-sectional shape and including a first cross-sectional sub-image, a second cross-sectional sub-image, and a third cross-sectional sub-image; and
   a controller configured or programmed to control the projector; wherein
   the image projecting surface includes:
      a first area;
      a second area adjacent to the first area; and
      a third area adjacent to the second area;

the projector includes:
  a first projector capable of projecting the first cross-sectional sub-image onto the first area, and the second cross-sectional sub-image onto the second area; and
  a second projector capable of projecting the second cross-sectional sub-image onto the second area, and the third cross-sectional sub-image onto the third area;
the first projector and the second projector apply equal or substantially equal total amounts of optical energy;
the controller performs a first projecting operation and a second projecting operation;
the first projecting operation involves simultaneously projecting:
  the first cross-sectional sub-image and the second cross-sectional sub-image from the first projector onto the first area and the second area, respectively; and
  the second cross-sectional sub-image and the third cross-sectional sub-image from the second projector onto the second area and the third area, respectively;
the second projecting operation involves simultaneously projecting:
  the first cross-sectional sub-image from the first projector onto the first area; and
  the third cross-sectional sub-image from the second projector onto the third area; and
the controller equalizes a number of times the first to third cross-sectional sub-images are to be respectively projected onto the first to third areas.

2. The three-dimensional printing apparatus according to claim 1, wherein the controller performs the first projecting operation prior to the second projecting operation.

3. The three-dimensional printing apparatus according to claim 1, wherein the controller alternately and repeatedly performs the first projecting operation and the second projecting operation.

4. The three-dimensional printing apparatus according to claim 1, wherein
  the image projecting surface further includes:
    a fourth area adjacent to the first area;
    a fifth area adjacent to the second area and the fourth area;
    a sixth area adjacent to the third area and the fifth area; and
    a seventh area adjacent to the fourth area, the fifth area, and the sixth area;
  the cross-sectional image further includes a fourth cross-sectional sub-image, a fifth cross-sectional sub-image, a sixth cross-sectional sub-image, and a seventh cross-sectional sub-image;
  the first projector is capable of further projecting the fourth cross-sectional sub-image onto the fourth area, and the fifth cross-sectional sub-image onto the fifth area;
  the second projector is capable of further projecting the fifth cross-sectional sub-image onto the fifth area, and the sixth cross-sectional sub-image onto the sixth area;
  the projector further includes a third projector capable of projecting the fourth cross-sectional sub-image onto the fourth area, the fifth cross-sectional sub-image onto the fifth area, the sixth cross-sectional sub-image onto the sixth area, and the seventh cross-sectional sub-image onto the seventh area;
  the first projector, the second projector, and the third projector apply equal or substantially equal total amounts of optical energy;
  the first projecting operation further involves simultaneously projecting:
    the fourth cross-sectional sub-image and the fifth cross-sectional sub-image from the first projector onto the fourth area and the fifth area, respectively;
    the fifth cross-sectional sub-image and the sixth cross-sectional sub-image from the second projector onto the fifth area and the sixth area, respectively; and
    the fourth cross-sectional sub-image, the fifth cross-sectional sub-image, the sixth cross-sectional sub-image, and the seventh cross-sectional sub-image from the third projector onto the fourth area, the fifth area, the sixth area, and the seventh area, respectively;
  the second projecting operation further involves projecting the seventh cross-sectional sub-image from the third projector onto the seventh area;
  the controller further performs at least one of a third projecting operation, a fourth projecting operation, a fifth projecting operation, and a sixth projecting operation;
  the third projecting operation involves simultaneously projecting:
    the second cross-sectional sub-image from the first projector onto the second area;
    the sixth cross-sectional sub-image from the second projector onto the sixth area; and
    the fourth cross-sectional sub-image from the third projector onto the fourth area;
  the fourth projecting operation involves simultaneously projecting:
    the fourth cross-sectional sub-image from the first projector onto the fourth area;
    the second cross-sectional sub-image from the second projector onto the second area; and
    the sixth cross-sectional sub-image from the third projector onto the sixth area;
  the fifth projecting operation involves simultaneously projecting:
    the first cross-sectional sub-image and the fourth cross-sectional sub-image from the first projector onto the first area and the fourth area, respectively;
    the second cross-sectional sub-image and the third cross-sectional sub-image from the second projector onto the second area and the third area, respectively; and
    the sixth cross-sectional sub-image and the seventh cross-sectional sub-image from the third projector onto the sixth area and the seventh area, respectively;
  the sixth projecting operation involves simultaneously projecting:
    the first cross-sectional sub-image and the second cross-sectional sub-image from the first projector onto the first area and the second area, respectively;
    the third cross-sectional sub-image and the sixth cross-sectional sub-image from the second projector onto the third area and the sixth area, respectively; and
    the fourth cross-sectional sub-image and the seventh cross-sectional sub-image from the third projector onto the fourth area and the seventh area, respectively; and
  the controller equalizes a number of times the first to seventh cross-sectional sub-images are to be respectively projected onto the first to seventh areas.

5. The three-dimensional printing apparatus according to claim 4, wherein the controller performs the first projecting operation prior to the second projecting operation, the third projecting operation, the fourth projecting operation, the fifth projecting operation, and the sixth projecting operation.

6. The three-dimensional printing apparatus according to claim 1, wherein the image projecting surface further includes:
 a fourth area adjacent to the first area;
 a fifth area adjacent to the second area and the fourth area;
 a sixth area adjacent to the third area and the fifth area;
 a seventh area adjacent to the fourth area;
 an eighth area adjacent to the fifth area and the seventh area; and
 a ninth area adjacent to the sixth area and the eighth area;
the cross-sectional image further includes a fourth cross-sectional sub-image, a fifth cross-sectional sub-image, a sixth cross-sectional sub-image, a seventh cross-sectional sub-image, an eighth cross-sectional sub-image, and a ninth cross-sectional sub-image;
the first projector is capable of further projecting the fourth cross-sectional sub-image onto the fourth area, and the fifth cross-sectional sub-image onto the fifth area;
the second projector is capable of further projecting the fifth cross-sectional sub-image onto the fifth area, and the sixth cross-sectional sub-image onto the sixth area;
the projector further includes:
 a fourth projector capable of projecting the fourth cross-sectional sub-image onto the fourth area, the fifth cross-sectional sub-image onto the fifth area, the seventh cross-sectional sub-image onto the seventh area, and the eighth cross-sectional sub-image onto the eighth area; and
 a fifth projector capable of projecting the fifth cross-sectional sub-image onto the fifth area, the sixth cross-sectional sub-image onto the sixth area, the eighth cross-sectional sub-image onto the eighth area, and the ninth cross-sectional sub-image onto the ninth area;
the first projector, the second projector, the fourth projector, and the fifth projector apply equal or substantially equal total amounts of optical energy;
the first projecting operation further involves simultaneously projecting:
 the fourth cross-sectional sub-image and the fifth cross-sectional sub-image from the first projector onto the fourth area and the fifth area, respectively;
 the fifth cross-sectional sub-image and the sixth cross-sectional sub-image from the second projector onto the fifth area and the sixth area, respectively;
 the fourth cross-sectional sub-image, the fifth cross-sectional sub-image, the seventh cross-sectional sub-image, and the eighth cross-sectional sub-image from the fourth projector onto the fourth area, the fifth area, the seventh area, and the eighth area, respectively; and
 the fifth cross-sectional sub-image, the sixth cross-sectional sub-image, the eighth cross-sectional sub-image, and the ninth cross-sectional sub-image from the fifth projector onto the fifth area, the sixth area, the eighth area, and the ninth area, respectively;
the second projecting operation further involves simultaneously projecting:
 the seventh cross-sectional sub-image from the fourth projector onto the seventh area; and
 the ninth cross-sectional sub-image from the fifth projector onto the ninth area;
the controller further performs at least one of a seventh projecting operation and an eighth projecting operation;
the seventh projecting operation involves simultaneously projecting:
 the second cross-sectional sub-image from the first projector onto the second area;
 the sixth cross-sectional sub-image from the second projector onto the sixth area;
 the fourth cross-sectional sub-image from the fourth projector onto the fourth area; and
 the eighth cross-sectional sub-image from the fifth projector onto the eighth area;
the eighth projecting operation involves simultaneously projecting:
 the first cross-sectional sub-image and the fourth cross-sectional sub-image from the first projector onto the first area and the fourth area, respectively;
 the second cross-sectional sub-image and the third cross-sectional sub-image from the second projector onto the second area and the third area, respectively;
 the seventh cross-sectional sub-image and the eighth cross-sectional sub-image from the fourth projector onto the seventh area and the eighth area, respectively; and
 the sixth cross-sectional sub-image and the ninth cross-sectional sub-image from the fifth projector onto the sixth area and the ninth area, respectively; and
the controller equalizes a number of times the first to ninth cross-sectional sub-images are to be respectively projected onto the first to ninth areas.

7. The three-dimensional printing apparatus according to claim 6, wherein the controller performs the first projecting operation prior to the second projecting operation, the seventh projecting operation, and the eighth projecting operation.

* * * * *